(12) United States Patent
VanderZanden et al.

(10) Patent No.: US 10,607,492 B2
(45) Date of Patent: Mar. 31, 2020

(54) CROWDSOURCED SERVICING OF ON-DEMAND ELECTRIC-VEHICLES

(71) Applicant: Bird Rides, Inc., Santa Monica, CA (US)

(72) Inventors: Travis VanderZanden, Santa Monica, CA (US); William Scott Rushforth, Los Angeles, CA (US); Justin Balthrop, Los Angeles, CA (US)

(73) Assignee: Bird Rides, Inc., Santa Monica, CA (US)

( * ) Notice: Subject to any disclaimer, the term of this patent is extended or adjusted under 35 U.S.C. 154(b) by 0 days.

(21) Appl. No.: 16/376,546

(22) Filed: Apr. 5, 2019

(65) Prior Publication Data

US 2019/0311630 A1    Oct. 10, 2019

Related U.S. Application Data

(60) Provisional application No. 62/654,213, filed on Apr. 6, 2018, provisional application No. 62/664,457, filed
(Continued)

(51) Int. Cl.
*G01C 21/34* (2006.01)
*G06Q 10/02* (2012.01)
(Continued)

(52) U.S. Cl.
CPC .............. *G08G 1/205* (2013.01); *B60L 58/12* (2019.02); *G01C 21/3438* (2013.01);
(Continued)

(58) Field of Classification Search
CPC .......... G08G 1/205; G08G 1/13; G08G 1/202; B60L 58/12; G01C 21/3438; G06Q 10/02
See application file for complete search history.

(56) References Cited

U.S. PATENT DOCUMENTS

2011/0010300 A1    1/2011  Audet
2012/0109519 A1*   5/2012  Uyeki ................. B60L 7/14
                                                     701/439
(Continued)

FOREIGN PATENT DOCUMENTS

WO      2017217936         12/2017
WO   WO-2017217936 A1 *    12/2017   .............. B62M 6/00

OTHER PUBLICATIONS

John Miller. "I Signed Up to Be a Bird Electric Scooter Charger, Here's What It's Like"; Article [online]. Mar. 28, 2018 [retrieved Jun. 5, 2019]. Retrieved from Internet: <URL: https://ridesharenews.org/2018/03/28/i-signed-up-to-be-a-bird-electric-scooter-charger-heres-what-its-like/.

*Primary Examiner* — Stephen Holwerda
(74) *Attorney, Agent, or Firm* — Van Pelt, Yi & James LLP

(57) ABSTRACT

Crowdsourced servicing of on-demand electric-vehicles is disclosed. In various embodiments, data representing one or more of a location and a replenishment-related attribute value of at least a subset of electric vehicles comprising a fleet of electric vehicles made available for use on demand is received via a communication interface. A determination is made based at least in part on the respective replenishment-related attribute value of electric vehicles included in the at least a subset a set of electric vehicles required to be replenished. A display indicating for each of at least a subset of electrical vehicles required to be replenished a location of the vehicle and a price offered to retrieve, replenish, and redeploy the vehicle is provided via the communication interface to each of a plurality of users.

20 Claims, 15 Drawing Sheets

Related U.S. Application Data on Apr. 30, 2018, provisional application No. 62/675,557, filed on May 23, 2018.

(51) Int. Cl.
*G08G 1/13* (2006.01)
*G08G 1/00* (2006.01)
*B60L 58/12* (2019.01)

(52) U.S. Cl.
CPC ............... *G06Q 10/02* (2013.01); *G08G 1/13* (2013.01); *G08G 1/202* (2013.01)

(56) References Cited

U.S. PATENT DOCUMENTS

| | | |
|---|---|---|
| 2012/0239248 A1* | 9/2012 | Bobbitt .................. G08G 1/127 701/36 |
| 2013/0110296 A1 | 5/2013 | Khoo |
| 2013/0226633 A1 | 8/2013 | Brock |
| 2013/0266188 A1 | 10/2013 | Bulan |
| 2014/0188318 A1* | 7/2014 | Langgood ............... G06F 17/00 701/22 |
| 2016/0023636 A1* | 1/2016 | Keating ................. G08G 1/205 701/2 |
| 2016/0093214 A1* | 3/2016 | Wu ........................ G08G 1/147 348/148 |
| 2016/0132947 A1* | 5/2016 | Bollman, IV ...... G06Q 30/0611 705/26.4 |
| 2017/0039668 A1 | 2/2017 | Luke |

\* cited by examiner

CROWDSOURCED SERVICING OF ON-DEMAND ELECTRIC-VEHICLES

CROSS REFERENCE TO OTHER APPLICATIONS

This application claims priority to U.S. Provisional Patent Application No. 62/654,213 entitled CROWD SOURCED CHARGING OF ON-DEMAND ELECTRIC-VEHICLES filed Apr. 6, 2018 which is incorporated herein by reference for all purposes; and claims priority to U.S. Provisional Patent Application No. 62/664,457 entitled INCENTIVIZING PEOPLE TO RELOCATE AN ON-DEMAND ELECTRIC-VEHICLE filed Apr. 30, 2018 which is incorporated herein by reference for all purposes; and claims priority to U.S. Provisional Patent Application No. 62/675,557 entitled CROWDSOURCED MAINTENANCE OF ON-DEMAND ELECTRIC-VEHICLES filed May 23, 2018 which is incorporated herein by reference for all purposes.

BACKGROUND OF THE INVENTION

On-demand vehicle-sharing provides consumers with the ability to rent vehicles instantly through a mobile device. Traditionally, human-powered vehicles such as bicycles have been the primary vehicle of choice for these vehicle-sharing programs. However, consumers may want to have access to shared use of electric vehicles as well.

The sharing of electric vehicles poses unique challenges when compared to sharing non-electric vehicles. For example, needing to charge vehicle batteries is an obstacle that must be overcome to have a successful electric vehicle-sharing program. In addition, on-demand vehicles not tied to a particular docking location may be left by a user at a sub-optimal or not authorized location. Further, on demand electric vehicles may become damaged and need repairs or other maintenance.

Fixed docking stations with vehicle charging capabilities could in theory be used to charge electric vehicles when not in use. However, docking stations are not ideal for vehicle-sharing models as they drastically restrict the number of locations users can pick up vehicles from, and special docking station and/or vehicle equipment, such as chargers, connectors, and power sources, would be required and could provide a disincentive to use, especially if the docking or undocking were made less convenient or more difficult for the user.

BRIEF DESCRIPTION OF THE DRAWINGS

Various embodiments of the invention are disclosed in the following detailed description and the accompanying drawings.

DETAILED DESCRIPTION

Figure 1A:
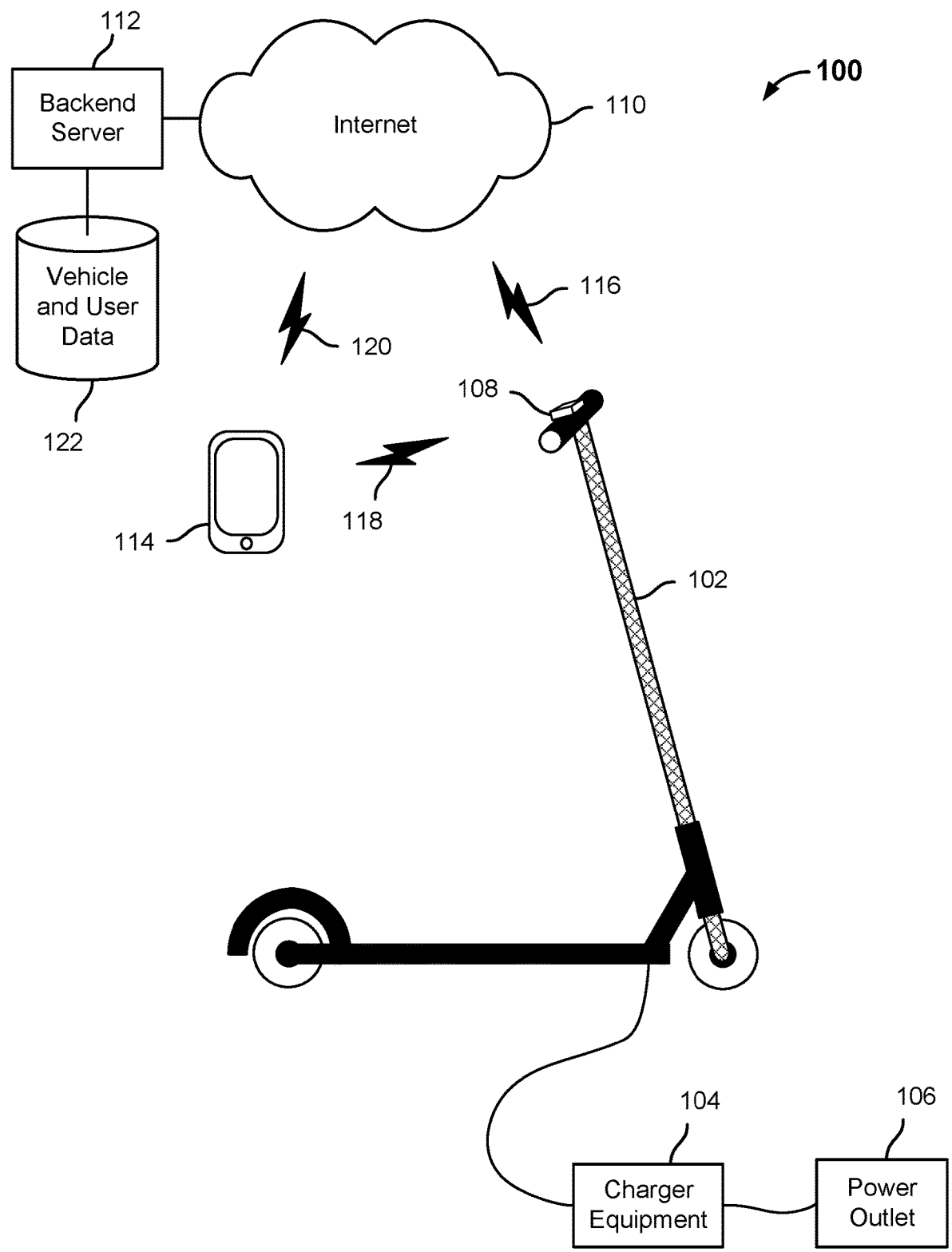
FIG. 1A is a block diagram illustrating an embodiment of a system to perform crowdsourced charging of on-demand electric vehicles.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Crowdsourced servicing of on-demand electric-vehicles is disclosed. In various embodiments, crowdsourced servicing incentives are determined and updated dynamically, via automated processes, and provided to crowdsourced service providers via automatic updates. In some embodiments, a portal for users to sign up to service vehicles is provided. A mobile app that displays vehicle geo-location and dynamically updated pricing or other incentive data is provided. Dynamically determined prices and other incentives to service vehicles are displayed to users, e.g., via the mobile app.

In various embodiments, "servicing" of on demand electric vehicles may include one or more of retrieving vehicles for servicing, charging vehicles, repairing or performing other maintenance on vehicles, relocating vehicles to more desired locations, and deploying to a deployment location vehicles that have been serviced.

In various embodiments, different and potentially overlapping groups of crowdsourced independent contractors may be incentivized, e.g., via a mobile app and/or portal and an associated backend service, to service on demand electric vehicles. For example, a first group of crowdsourced independent contractors may sign up to charge vehicles. Members of this first group in some embodiments would be sent charger devices to be used to charge electric vehicles and provided a charger user interface to locate, claim (e.g., reserve), and retrieve vehicles to be charged by them, e.g., for a price offered via the charger user interface. A second group of crowdsourced independent contractors, potentially overlapping with the first, may sign up to perform maintenance and repair functions with respect to vehicles. Members of this second group in some embodiments would be provided a "mechanics" user interface to locate, claim (e.g., reserve), and retrieve vehicles to be repaired or otherwise maintained by them, e.g., for a price offered via the mechanics user interface. Finally, the same and/or a third group of crowdsourced independent contractors may sign up to relocate vehicles to new deployment locations. In various embodiments, all or part of a given type of task may be performed by a single crowdsourced independent contractor or by a series of independent contractors. For example, one may pick up vehicles and deliver them to another to be charged, while a third person may redeploy the vehicles, e.g., the next morning.

In various embodiments, crowdsourced servicing of electric vehicles, as disclosed herein, overcomes the technical problem of servicing such vehicles when they are not in a fixed docking station. Other technical obstacles overcome, in various embodiments, as disclosed herein include without limitation one or more of ensuring that an independent contractor interested in servicing vehicles is able to find efficiently within a fleet of electric vehicles a subset of vehicles the independent contractor desires to service for an offered fee; dynamically repricing the price offered to service vehicles based on one or more factors; ensuring an independent contractor assigned to service a vehicle picks up the correct vehicle; ensuring a vehicle is not picked up by a person other than the independent contractor assigned to service it; and enabling an independent contractor to easily move a vehicle to be able to service it.

In various embodiments, one or more of the following requirements are met to maintain and service a fleet of electric vehicles:

1. Removing low-battery and/or damaged vehicles from the available fleet of vehicles
2. Charging and/or repairing the removed vehicles
3. Re-introducing the removed vehicles back into the available fleet In various embodiments, crowdsourced servicing as disclosed herein enables the above requirements to be met, even as the fleet of electric vehicles scales to large quantities and expansive geographies.

In various embodiments, servicing of electric vehicles comprising a shared fleet is crowdsourced by providing incentives to independent contractors who are paid to achieve these requirements, e.g., on a per-vehicle basis. In various embodiments, an automated system that manages these contractors and their payouts is provided.

Examples of electric vehicles serviced in various embodiments using techniques disclosed herein include without limitation electric scooters; electric bikes, minibikes, motor scooters, and motorcycles; skateboards, hover boards, and other single- or multi-wheeled electrically-powered boards; and self-balancing personal electric vehicles.

In various embodiments, the following terms (in bold) and associated meanings may be used to describe embodiments of a system to perform crowdsourced servicing of on-demand electric vehicles as disclosed herein:

Available State.

Vehicles in the "Available" state satisfy all conditions for being rentable by a rider, in various embodiments. For example, in some embodiments, a vehicle is designated by the system as "Available" if the vehicle is in good repair and has sufficient charge to be rented, is in a location from which the vehicle is authorized to be rented, and has not been reported as lost, stolen, damaged, etc. In some embodiments, techniques disclosed herein are used to ensure that Available vehicles are not "captured" (e.g., taken out of service for charging, repairs, updates, etc.) by crowdsourced independent contractors.

Unavailable State.

In various embodiments, vehicles in the "Unavailable" state violate at least one of the conditions that constitute an "Available" vehicle. In various embodiments, techniques disclosed herein are used to ensure that Unavailable vehicles cannot be rented by a rider.

Servicing State.

In various embodiments, vehicles in the "Servicing" state are in the process of being serviced by a crowdsourced independent contractor. In various embodiments, techniques disclosed herein are used to ensure that vehicles in the Servicing State cannot be rented by a rider. In some embodiments, a vehicle in the Servicing State may also and/or instead be considered in a state associated with the particular service being provided, e.g., a "Charging State" for charging and a "Maintenance State" for repairs and/or other maintenance.

Charger.

In various embodiments, a "charger" (or "Charger") is an independent contractor who captures, charges, and deploys vehicles. In various embodiments, they are paid based on the number of vehicles they successfully capture, charge, and/or deploy. In some embodiments, there may be multiple Chargers and/or other workers who contribute to fulfilling the Servicing State.

Mechanic.

In various embodiments, a "mechanic" (or "Mechanic") is an independent contractor who captures, repairs and/or performs other maintenance on, and deploys vehicles. In various embodiments, they are paid based on the number of vehicles they successfully capture, service, and/or deploy. In some embodiments, there may be multiple Mechanics and/or other workers who contribute to fulfilling the Servicing State.

Replenisher.

In various embodiments, a "replenisher" (or "Replenisher") is an independent contractor who captures, performs a service on or with respect to (e.g., charges, repairs, relocates), and/or deploys vehicles. A Replenisher may be a Charger, a Mechanic, or another crowd sources provider of a service or function with respect to on demand electric vehicles.

Capture.

In various embodiments, Chargers "capture" vehicles while they are in the Unavailable state. Capture may include one or more of retrieving the vehicle from a location at which it was left by a rider, and taking the vehicle to a charging location or an intermediate location on its way to a charging location.

Hours of Operation.

In various embodiments, "Hours of Operation" refer to the time period when vehicles can be rented by a rider.

Operational Boundaries.

In various embodiments, "Operational Boundaries" refer to a pre-determined, closed boundary of location coordinates of where vehicles can be rented by a rider.

Deploy.

In various embodiments, Chargers "deploy" vehicles once the vehicle is ready to be re-introduced into the Available fleet. Deploying may include delivering a charged vehicle to a location from which it may be rented.

Rider.

In various embodiments, "Riders" are the consumers who rent vehicles.

A number of examples described below refer to vehicles being charged by chargers; however, in various embodiments, the same systems, processes, and interfaces are adapted to incentive Replenishers to perform other tasks, such as repair/maintenance and/or vehicle retrieval, delivery, deployment, and/or relocation services.

FIG. 1A is a block diagram illustrating an embodiment of a system to perform crowdsourced charging of on-demand electric vehicles. In the example shown, the system 100 includes a plurality electric vehicles available for use "on demand", represented in FIG. 1A by electric scooter 102. Electric scooter 102 and other vehicles in the fleet are propelled by an electric motor (not shown) powered by a battery (not shown), e.g. a battery in the foot board and/or located elsewhere in scooter 102. The battery of scooter 102 is depleted through use. Charger equipment 104 plugged into a power outlet or other power source 106 is used to charge the battery of scooter 102.

In various embodiments, independent contractors referred to herein as "chargers", are recruited via a mobile app or other interface to charge vehicles comprising the fleet, such as scooter 102. Each vehicle is equipped with a circuit board 108 comprising a communication functionality, such as WiFi, Bluetooth, GPS, cellular, etc., enabling the vehicle to connect directly or indirectly (e.g., via a user's mobile device) via the Internet 110 to a backend server 112. The connection may be via direct wireless communication 116, if equipped, or indirect, e.g., via Bluetooth or other near field communication 118 to a user's mobile device 114 configured to relay information via communications 120 to the backend server 112 via the Internet 110. For example, a mobile device 114 carried by a user renting and/or riding the scooter 102, a mobile device 114 carried by a user who passes near the scooter 102 on the street, and/or a mobile device 114 of a user who has retrieved the scooter 102 to charge it may be used to receive vehicle state information from the scooter 102 and relay such information via the Internet 110 to backend server 112.

In various embodiments, vehicle state information including at least a battery charge level of scooter 102 and a location of scooter 102 may be reported from time to time and/or upon occurrence of certain events (e.g., state transitions, as described in connection with FIG. 1B) to backend server 112. Backend server 112 in various embodiments maintains current and/or historical vehicle state information in a vehicle and user data store 122, e.g., a database. Vehicle information stored in data store 122 may include without limitation a history of preventive maintenance, repairs, ride and/or other usage history and data, user and/or charger feedback about the vehicle and/or its condition, charge state, battery health, etc. User information stored in data store 122 may include without limitation records associated with users registered to ride vehicles comprising the fleet, such as scooter 102, and users registered to charge vehicles comprising the fleet in exchange for a payment and/or other consideration (e.g., ride credits, virtual currency, status or other recognition within a user community, etc.). User records for users who charge vehicles (sometimes referred to as "chargers") in various embodiments may include information indicating which vehicles are currently being charged (or reserved to be charged) by the user; financial account information; past, current, or expected payment information; charger performance metrics, such as percent on time redeployment, etc.; etc.

Figure 1B:
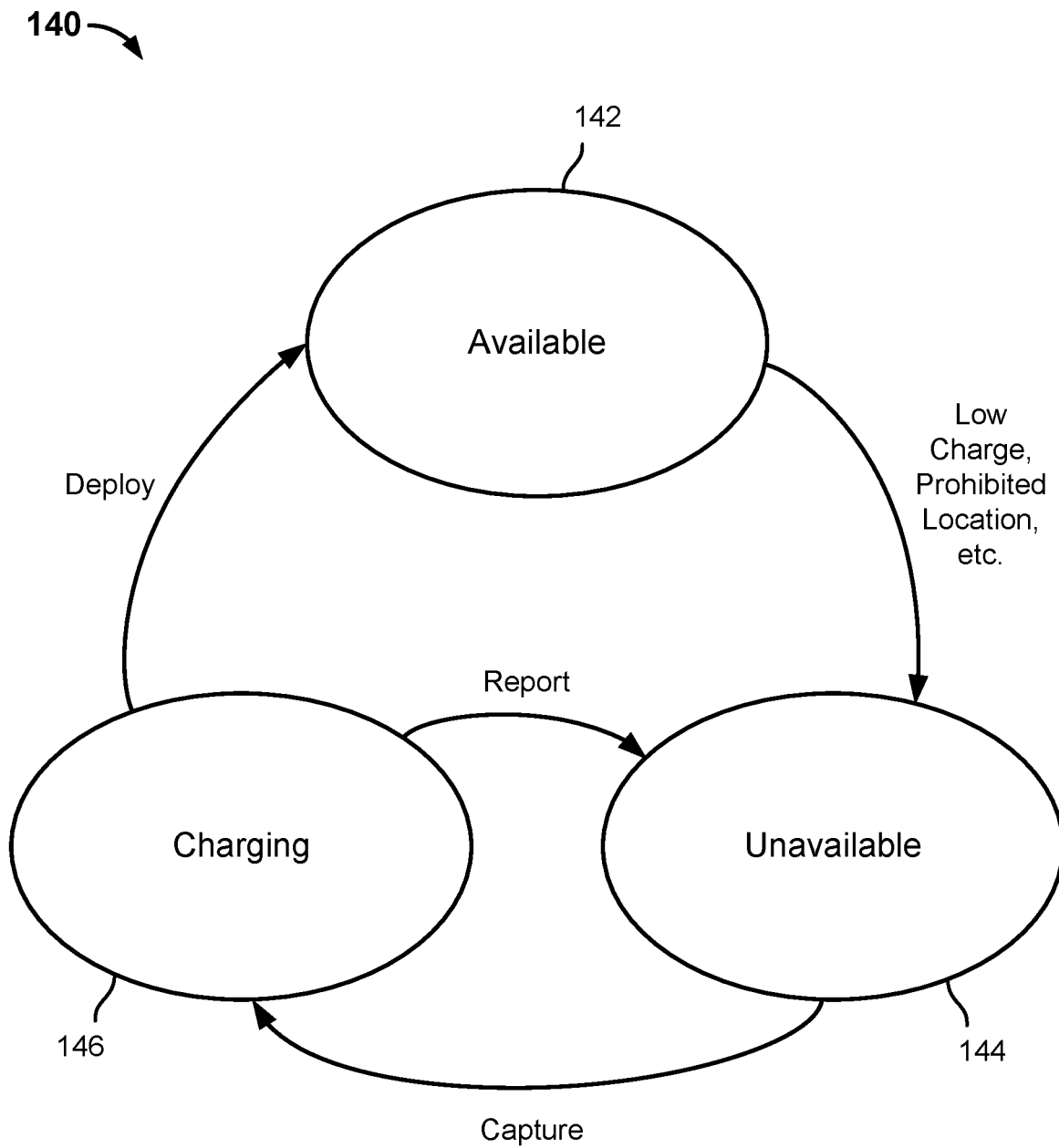
FIG. 1B is a state diagram illustrating states in which each on demand electric vehicle comprising a fleet may be, and transitions between such states, in an embodiment of a system to perform crowdsourced charging of on-demand electric vehicles.

FIG. 1B is a state diagram illustrating states in which each on demand electric vehicle comprising a fleet may be, and transitions between such states, in an embodiment of a system to perform crowdsourced charging of on-demand electric vehicles.

In the example shown, state machine 140 includes Available State 142. In various embodiments, a vehicle in the Available State 142 is available to be rented by a rider. For example, a vehicle that is fully or adequately charged and in a permitted location (e.g., within applicable Operational Boundaries) during a time in which use is permitted (e.g., within applicable Hours of Operation) may be in the Available State 142. In various embodiments, vehicle in the Available State 142 are visible in a mobile user interface available to riders and may be claimed/reserved for use via the mobile user interface. In some embodiments, state information indicating a vehicle is in the Available State 142 is stored in a backend database, such as vehicle and user data store 122 of FIG. 1A. Vehicle state information (e.g., location, charge level, etc.) reported periodically (on occurrence of a triggering event, opportunistically, etc.) to a backend server, such as backend server 112, is used in various embodiments to determine whether a vehicle is in the Available State 142 and to store in the backend database data representing the state. In some embodiments, a vehicle in the Available State 142 is not subject to being captured by a charger.

In various embodiments, the vehicle constantly monitors itself and its surroundings to determine if it is in violation of any conditions of being in the Available State 142. A non-exhaustive list of primary conditions that qualify a vehicle to be and/or remain in the Available State 142 in various embodiments includes one or more of:

1. The vehicle's battery levels are sufficiently charged given current time, location, and other contextual factors 2. The vehicle's geo-location is inside the operational boundaries
3. The current time-of-day is inside the hours of operation In some embodiments, one or more other conditions that relate to the vehicle operating status, weather conditions, or other factors, must be satisfied for a vehicle to be considered to be in the Available State 142.

In some embodiments, the threshold for what constitutes as "sufficiently charged" to remain in the Available State 142 may change dynamically throughout the day or in response to other factors. For example, during later operational hours, vehicles with higher battery levels may be considered unavailable even though the same vehicle with equivalent battery levels may not have been considered unavailable earlier in the day.

In various embodiments, the Available State 142 begins when the vehicle is deployed and ends when the vehicle enters the Unavailable State 144. In various embodiments, the Unavailable State 144 begins when a vehicle becomes Unavailable and ends when a charger captures the vehicle.

In various embodiments, upon entering the Unavailable State 144, one or both of the following changes take place in the system: (1) the vehicle no longer appears on the rider user-interface map, and as a result the vehicle can no longer be rented by a rider; and/or (2) the vehicle appears on the charger user-interface map, and as a result, the vehicle can now be captured by chargers.

In various embodiments, a vehicle in the Unavailable State 144 may be "captured" by a "charger" willing to charge the vehicle for a fee or other consideration. In the example shown in FIG. 1B, a vehicle in the Unavailable State 144 that is captured for charging enters the Charging State 146. In some embodiments, a vehicle is captured for charging by selecting the vehicle in a charger-facing user interface and selecting an option to capture the vehicle for charging. Capture results in the backend database record for the vehicle being updated to indicate it has been captured by the charger, and the user record of the charger being updated to reflect that the vehicle has been captured by the charger.

In the Charging State 146, a charger who has captured the vehicle receives via a charger-facing user interface information indicating where the vehicle is believed to be located. The charger retrieves the vehicle, if it can be located, and charges it using equipment such as charger equipment 104 in the example shown in FIG. 1A. If the vehicle cannot be located by the charger, or is damaged, the charger may submit a report, returning the vehicle to the Unavailable State 144, and in some embodiments triggering responsive action based on the report, such as deploying maintenance or other personnel (e.g., other independent contractors) to locate and/or repair the vehicle.

In various embodiments, the charge state of the vehicle is updated (e.g., continuously, periodically, upon being charged to one or more threshold levels, etc.) and the associated vehicle record is updated to reflect that charge state. Once the vehicle has been charged, the charger deploys the vehicle to a deployment location and the vehicle reenters the Available State 142. In some embodiments, the charger deploys the charged vehicle to a specific location, such as a deployment location reserved by the charger for the purpose. For example, the deployment location may be reserved (e.g., for a time) by the user via a charger-facing user interface. In some embodiments, the charger may be directed to deploy the vehicle to a location associated with a rider and/or a reservation to ride the vehicle.

In some embodiments, different individuals may fulfill different actions during the Charging State, such as capturing, charging, and deploying the vehicle. For example, the Charger who captured the vehicle may not be the same person who physically charges nor deploys the vehicle.

Once the charged vehicle has been deployed and reentered the Available State 142, a transaction is processed to credit (pay) the charger for charging the vehicle.

In various embodiments, the amount that a charger will be paid for charging and/or releasing a vehicle is adjusted in various embodiments based on one or more of:
1. The amount that the vehicle has been charged relative to the battery levels at the time of capturing the vehicle
2. The location of where the vehicle is deployed
3. The time when the vehicle is deployed
4. The number of vehicles in a given area and time
5. The number of riders in a given area and time In various other embodiments, one or more other conditions may be considered, such as vehicle operating status, weather conditions, and other factors, that are taken into account when calculating pricing.

In some embodiments in which different individuals may be fulfilling different actions during the Charging State 146, the act of paying each specific charger may take place after each action is fulfilled. For instance, in some embodiments, charger 1 can be paid after capturing the vehicle, charger 2 can be paid after charging the vehicle, and charger 3 can be paid after releasing the vehicle. In other embodiments, the entire Charging State 146 must be completed before paying the charger.

In some embodiments, vehicle maintenance and/or updates may be performed on a vehicle while the vehicle is in a Charging State 146. For example, firmware and/or other software updates and/or configuration updates may be pushed to the vehicle, e.g., via the Charger's mobile device, Wi-Fi, etc. In some embodiments, an additional incentive may be provided to a Charger to perform repairs, tune-ups, maintenance inspections, cosmetic repairs, etc. while a vehicle is in the Charging State 146.

In various embodiments, upon successful deployment of the vehicle after charging, the vehicle enters the Available State 142 and the entire process may be repeated.

Figure 2:
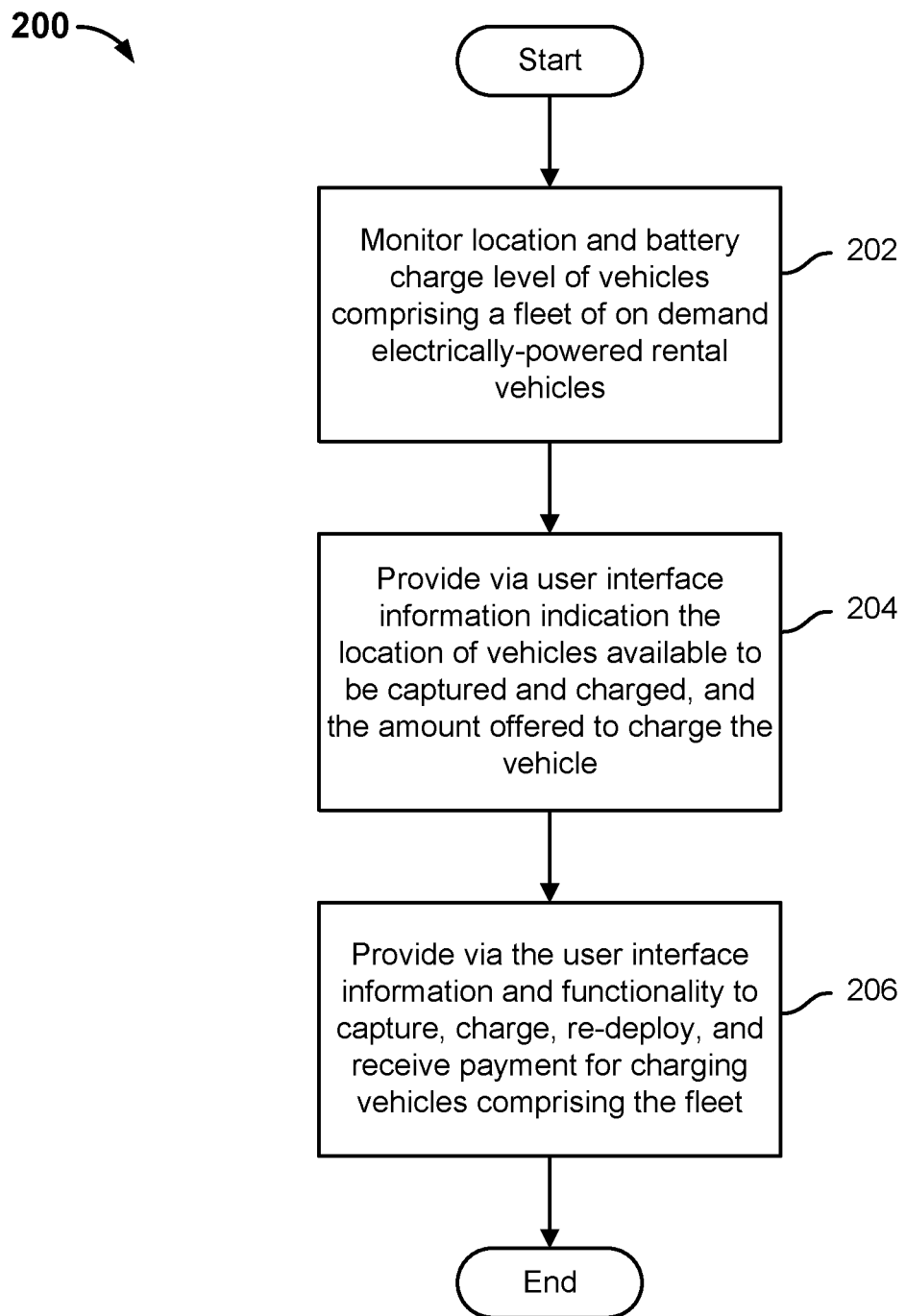
FIG. 2 is a flow chart illustrating an embodiment of a process to perform crowdsourced charging of on-demand electric vehicles.

FIG. 2 is a flow chart illustrating an embodiment of a process to perform crowdsourced charging of on-demand electric vehicles. In various embodiments, the process 200 of FIG. 2 is implemented, in whole or in part, by a backend server, such as backend server 112 of FIG. 1A. In some embodiments, all or part of the process 200 may be implemented by instances of a mobile app, each instance running on a mobile device associated with a crowdsourced independent contractor who participates and/or is registered to participate in charging on demand electric vehicles for payment or other consideration.

In the example shown, the geographic location and battery charge level of vehicle comprising a fleet of on demand electric vehicles is monitored (202). For example, each vehicle may report its location and/or battery charge level, directly or indirectly, as described above in connection with FIG. 1A.

The location and charge level information is used to provide, e.g., via a charger-facing mobile user interface, information indicating the location and (optionally) charge level of electric vehicles available to be captured and charge in exchange for a payment or other consideration, along with the payment or other consideration being offered to charge the vehicle (204). For example, each user signed up to charge vehicles may access a map-based mobile user interface to locate in an area of interest vehicles available to be charged for payment or other consideration. Each vehicle or clump of vehicles may be marked by a pin, icon, or other marker. The marker may indicate the price offered to charge the vehicle. Hovering on or selecting a given specific vehicle may result in charge level and/or other information being displayed. Vehicle numbers or other identifiers and/or additional information may be displayed, e.g., when the vehicle was last rented and/or used, when the location was last reported, etc.

Information and features to capture, charge, re-deploy, and receive payment for charging vehicles is deployed via the charger-facing user interface (206). For example, in some embodiments a user may claim/reserve (e.g., for a limited time) a vehicle to be retrieved and charged by that user. The vehicle enters a "captured" state associated with charging that prevents others users from claiming the vehicle, e.g., for a limited time, affording the user that captured the vehicle the opportunity to locate and retrieve the vehicle for charging without other users racing to claim the same vehicle. In some embodiments, a vehicle in the captured state is not displayed to other users via the charger-facing user interface, and/or is displayed in a manner that indicates the vehicle has been captured by another user. If the vehicle is not retrieved within a prescribed time, for example, in some embodiments the vehicle returns to the pool of vehicles available to be captured by other users.

Additional examples of functionality provided to facilitate charging include, without limitation, the ability to scan a QRC or other encoded identifier for a vehicle upon picking it up to be charged; ongoing monitoring of charge level through charging; an interface to locate, claim, and use designated locations to drop off and re-deploy vehicles; etc.

Figure 3:
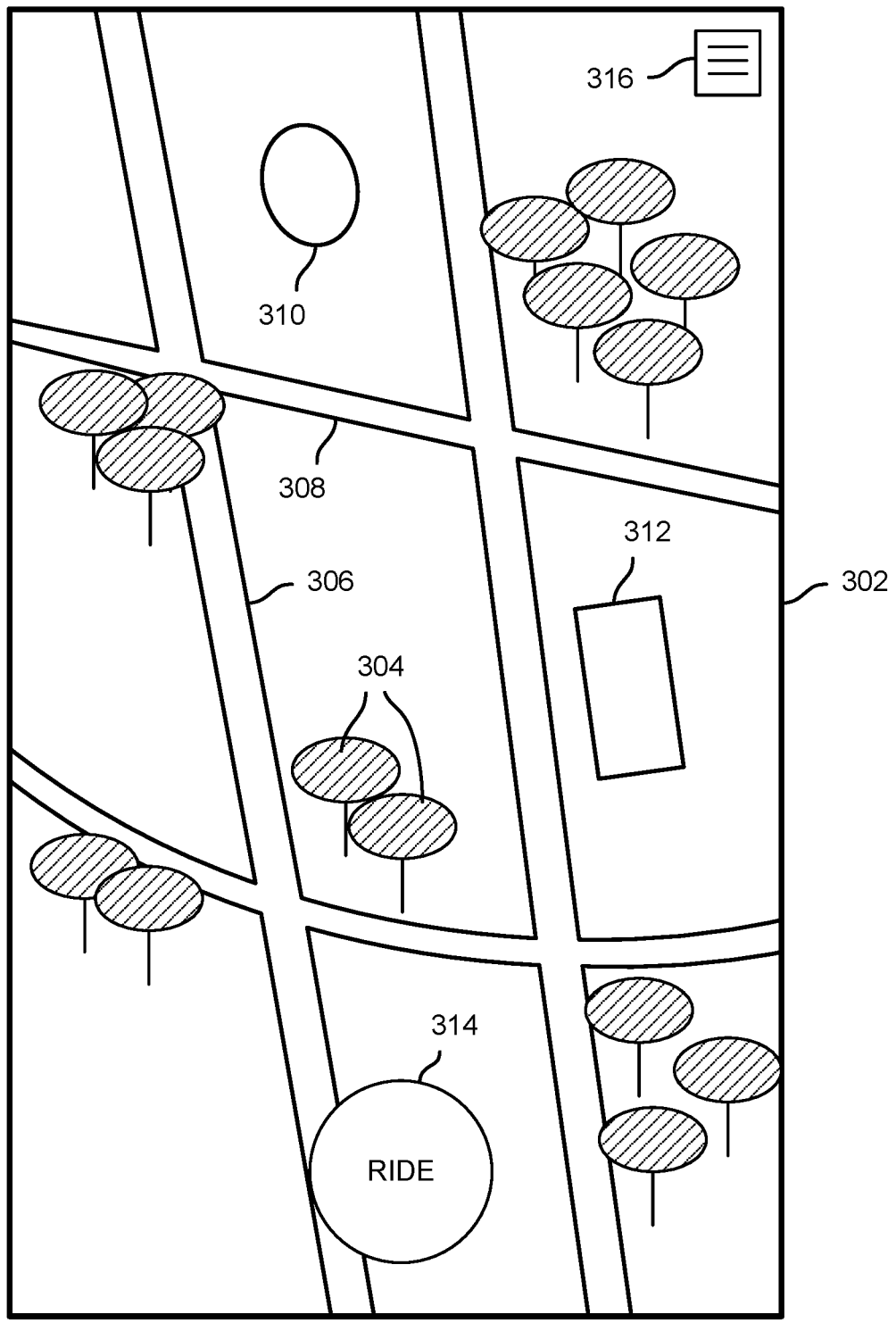
FIG. 3 is a diagram illustrating an embodiment of a user interface to locate and rent on-demand electric vehicles.

FIG. 3 is a diagram illustrating an embodiment of a user interface to locate and rent on-demand electric vehicles. In various embodiments, the user interface 302 of FIG. 3 is displayed on a mobile device via a mobile app running on the device using data received from a backend server, such as backend server 112 of FIG. 1A. In the example shown, user interface 302 comprises a map-based display in which electric vehicles (e.g., scooters) available to be rented and used are represented by location pin-style icons 304. Each instance of icon 304 may represent one or more vehicles at the indicated location, in various embodiments. In some embodiments, a two-finger squeeze gesture may be used to zoom out and moving two fingers further apart zooms in. In some embodiments, depending on the map scale and number of scooters in each location each icon 304 may represent one or more than one vehicle. As a user zooms in, for example, a group of vehicles represented by a single icon 304 may be disaggregated and each vehicle may come to instead be represented individually, e.g., each by an instance of icon 304.

In the example shown, vehicles are shown (icons 304) in locations relative to streets and/or pathways 306, 308 and landmarks 310, 312, such as buildings, fountains, parks, etc. A ride button 314 may be used to rent a vehicle for use. In some embodiments, a vehicle may be selected in user interface 302 and the ride button 314 selected to reserve the vehicle for use. In some embodiments, selection of the ride button 314 accesses a mobile device camera-based interface via which the user is prompted to use the mobile device to scan a QRC code, bar code, or other information physically displayed on a vehicle to rent the vehicle for use.

A vehicle rented for use in this manner in various embodiments results in the vehicle no longer appearing in corresponding instance of user interface 302 as displayed to other users. Additionally, the vehicle enters the "unavailable" state on the backend and records to track the user's usage of the vehicle (e.g., time, location, etc.) and to process a transaction to charge the user's credit card or other account for the ride are generated.

In the example shown, user interface 302 includes a menu/option button 316 in the upper right corner. In various embodiments, selection of menu/option button 316 results in a display page with additional controls, options, and/or information being displayed. In some embodiments, in the case of a user who has signed up to work as an independent contractor to charge vehicles comprising the fleet of on demand electric vehicles the display page accessed by selecting menu/option button 316 includes a toggle or other control to access options associated with charging electric vehicles, as in the example shown in FIGS. 4A and 4B.

Figure 4B:
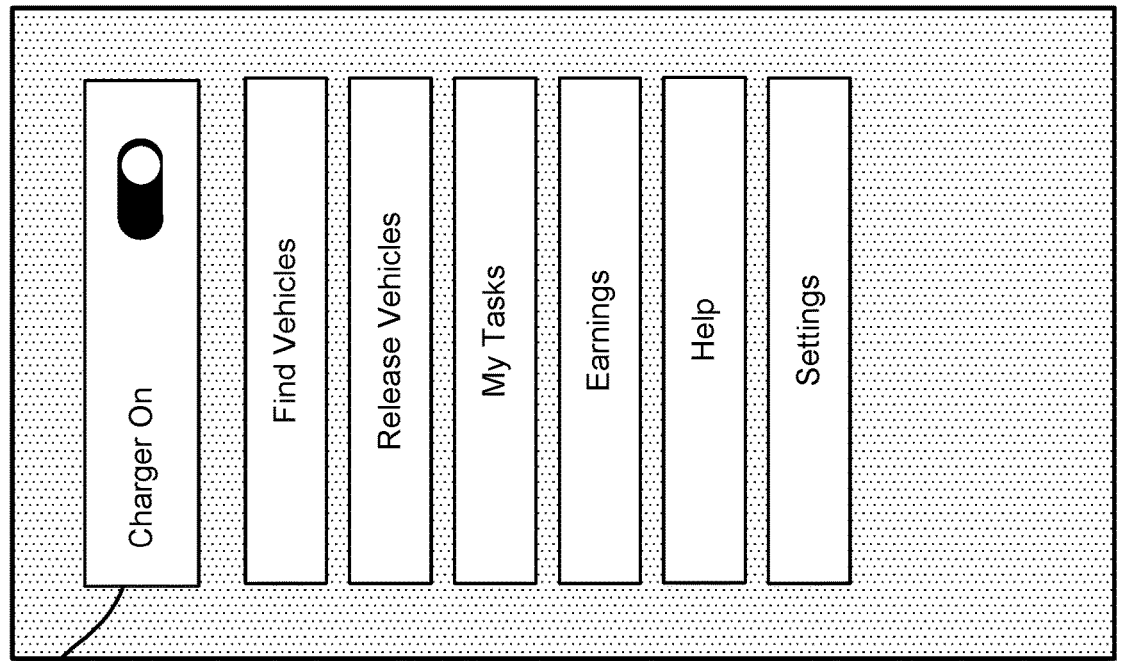
FIG. 4B is a diagram illustrating an embodiment of a switchable user interface to rent an on-demand electric vehicle or charge on-demand electric vehicles, in a state associated with charging on-demand electric vehicles.
Figure 4A:
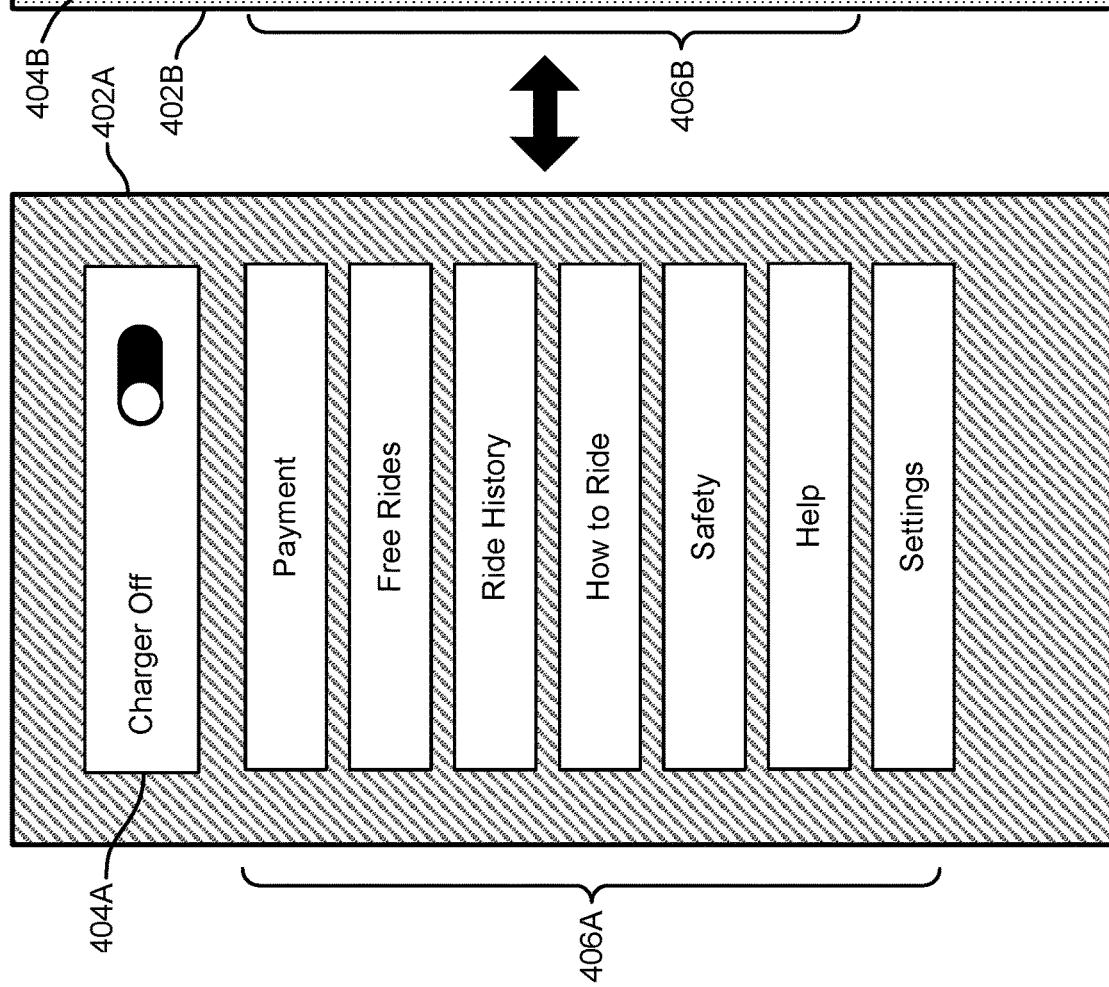
FIG. 4A is a diagram illustrating an embodiment of a switchable user interface to rent an on-demand electric vehicle or charge on-demand electric vehicles, in a state associated with renting an on-demand electric vehicle.

FIG. 4A is a diagram illustrating an embodiment of a switchable user interface to rent an on-demand electric vehicle or charge on-demand electric vehicles, in a state associated with renting an on-demand electric vehicle. In some embodiments, the additional options display page 402A of FIG. 4A is displayed upon selection of an additional menu/options button in a rider-facing user interface, such as menu/option button 316 of user interface 302 of FIG. 3.

In the example shown, display page 402A includes a "charger" mode toggle control 404A, in the "off" position as shown in FIG. 4A, and a set of vehicle rider-related options/controls 406A. As shown, the additional options/controls include controls to access options/functionality to make payments, e.g., for a recently-completed ride; a "free rides" button to learn about incentives and/or promotions that may enable a user to earn a free ride; a "ride history" button to review one's own history of use of on demand vehicles; a "how to ride" button to access video or other tutorials on how to ride on demand electric vehicles correctly, safely, legally, etc.; a "safety" button to learn safety tips and rules; a "help" button to access FAQ, help via a chat interface, etc.; and a "settings" button to change settings, such as screen name, default map view, preferred map program to get a route to a vehicle, payment methods, etc.

FIG. 4B is a diagram illustrating an embodiment of a switchable user interface to rent an on-demand electric vehicle or charge on-demand electric vehicles, in a state associated with charging on-demand electric vehicles. In the example shown, the charger mode toggle control 404A, 404B has been toggled to the charger mode on position, resulting in the display of a set of charger-related options 406B in place of the rider-related options 406A of FIG. 4A.

In the example shown, charger-related options 406B include controls to access functions to "find vehicles" to charge in exchange for payment or other consideration; to "release vehicles", i.e., to redeploy vehicles the user has charged by placing them in designated locations from which riders may again rent them; a "my tasks" control to access a display of charger-related tasks, such as a list of vehicles the user has captured to charge and/or is in progress of charging, and relevant information about each such as dynamically updated charge level, location, price for charging, etc.; an "earnings" control to view earnings history; a "help" control to access charger-facing FAQ's and/or help via a chat interface; and a "settings" control to change charger-related settings.

In various embodiments, selecting an "X" or other control to close the user interface of FIG. 4B, while in the charger mode as shown, results in display of a charger-related map-based user interface in which vehicles available to be charged, and with respect to each vehicle the payment or other consideration offered to charge the vehicle, being displayed.

Figure 5A:
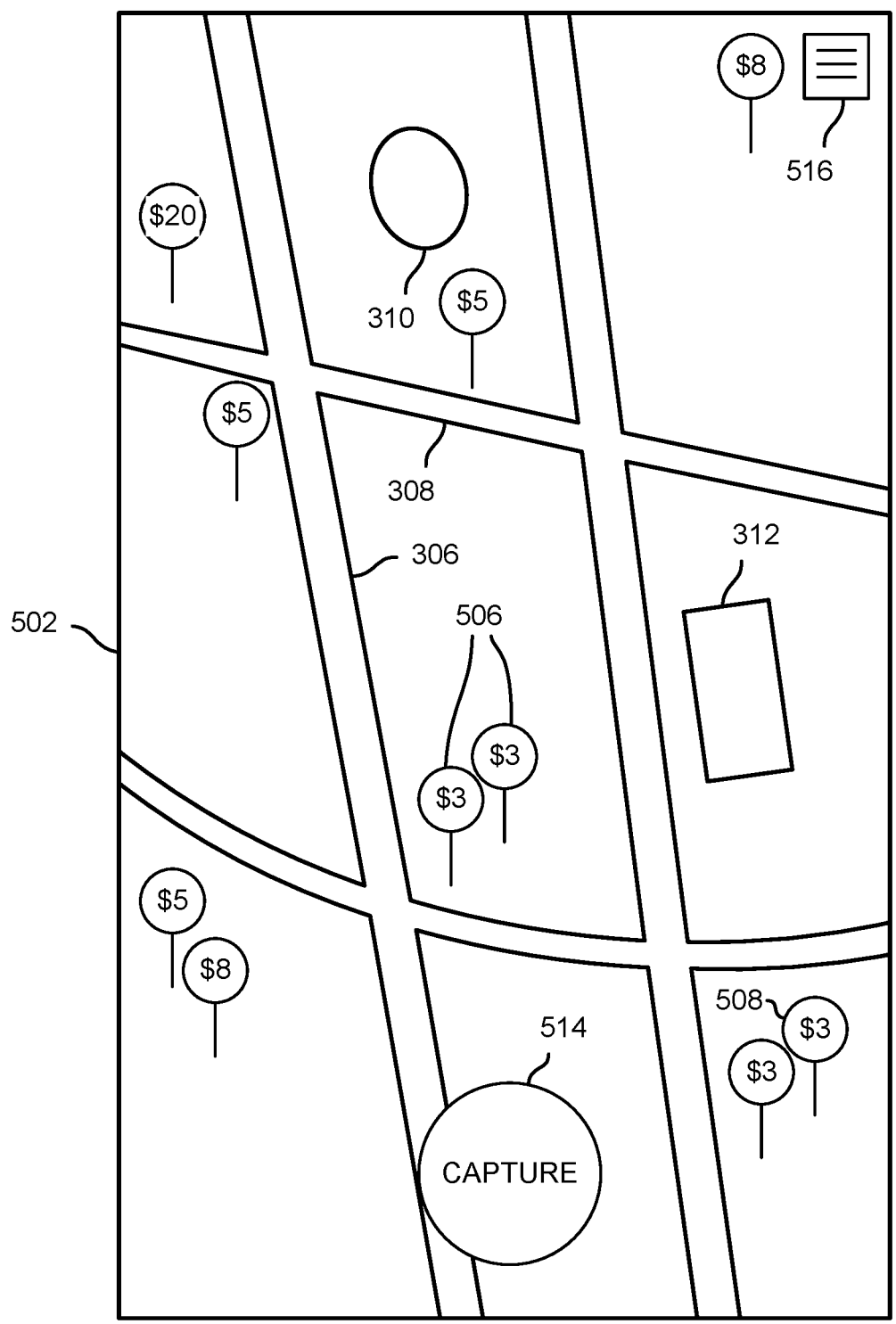
FIG. 5A is a diagram illustrating an embodiment of a user interface to locate electric vehicles to charge them.

FIG. 5A is a diagram illustrating an embodiment of a user interface to locate electric vehicles to charge them. In some embodiments, the map-based user interface 502 of FIG. 5A is displayed via a mobile app. In some embodiments, the mobile app may be used in a first mode to rent/ride electric vehicles and in a second mode to participate as an independent contractor in charging electric vehicles, e.g., overnight, for payment or other consideration.

In the example shown, the interactive map features of the user interface 302 of FIG. 3, e.g., streets 306, 308 and buildings and other landmarks 310, 312 are displayed, but instead of the icons 304 which in FIG. 3 represent vehicles available to rent in the example shown in FIG. 5 vehicles available to be captured and charged are represented by location pin-style icons 506, 508. Each icon 506, 508 marks the location of one or more vehicles available to be captured and charged. In this example, each icon 506, 508 includes a dollar amount being offered to capture, retrieve, charge, and timely redeploy the vehicle represented by that instance of the icon 506, 508. For example, $3 is offered to charge the vehicle represented by icon 508 in the bottom right corner of user interface 502.

User interface 502 includes a capture button 514. In various embodiments, selection of the capture button 514 in the context of a given vehicle (e.g., vehicle in a selected state in user interface 502—not shown—and/or vehicle QRC, barcode, IR tag, and/or other identifying information scanned by a mobile device in connection with selection of the capture button 514) results in backend data records being updated to change the state of the vehicle to captured/charging and to associate the vehicle with the capturing user in one or both of the vehicle record and the user's record at the backend.

Figure 5B:
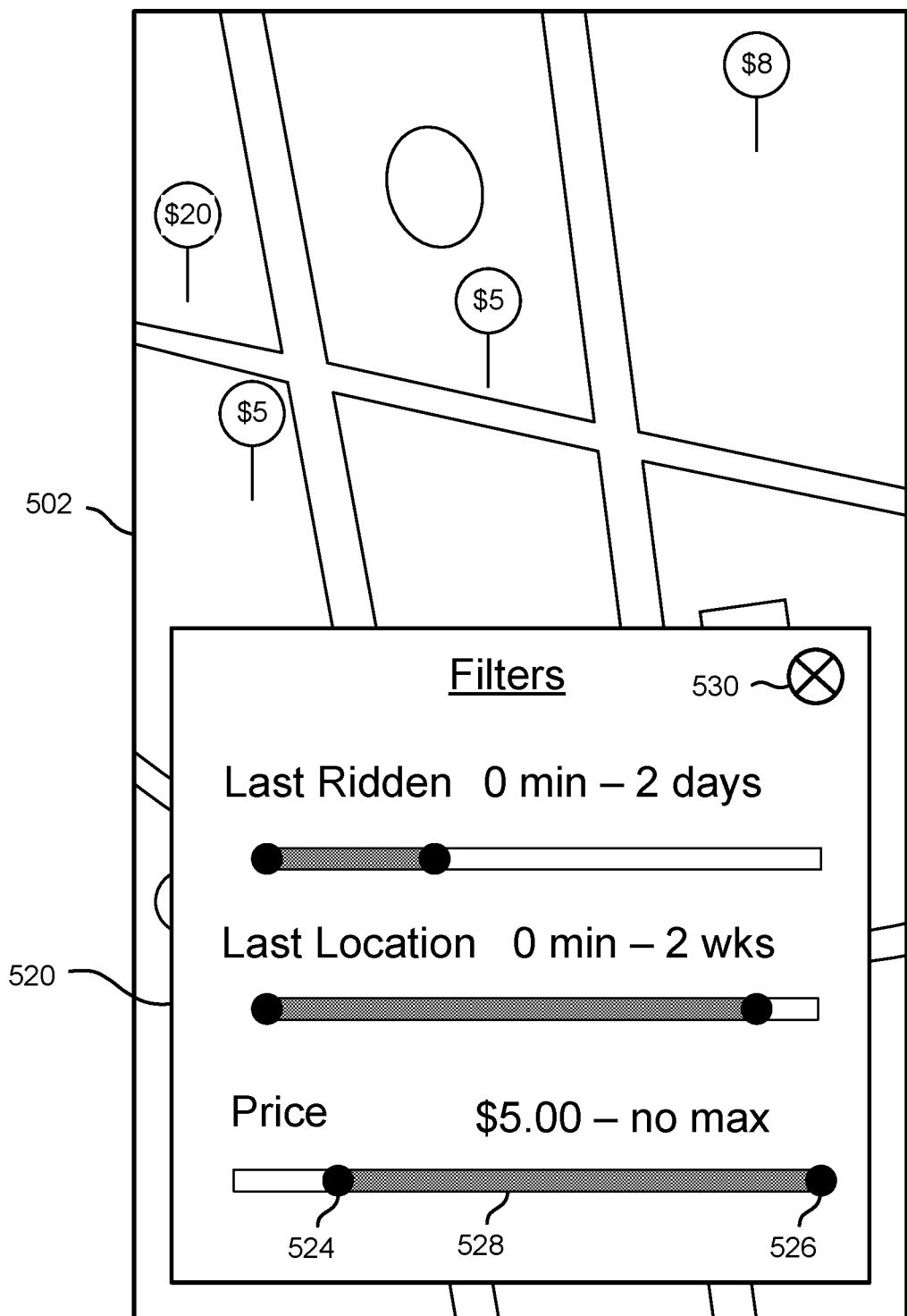
FIG. 5B is a diagram illustrating an embodiment of a user interface to locate electric vehicles to charge them.

User interface 516 in this example also includes an additional options/menu button 516, the selection of which causes an additional menu to be displayed, e.g., as in the example shown in FIG. 5B.

FIG. 5B is a diagram illustrating an embodiment of a user interface to locate electric vehicles to charge them. In the example shown, a set of filter controls is displayed in a pop up window 520 overlaying the user interface 502 of FIG. 5A. For example, selection of the additional options/menu button 516 of FIG. 5A may have resulted in display of pop up window 520.

In the example shown, the filter controls displayed in pop up window 520 include slider type controls to allow a user to set lower and upper limits to define a range of values for the indicated parameters, in this example how long ago a vehicle was last ridden by a user, how long ago the vehicle location was last reported and/or determined, and the price offered to charge a vehicle. In the example shown, the lower limit set point control 524 and upper limit set point control 526 have been used (e.g., by drag/drop) to define a price range of $5 to max (no upper limit), as represented by colored bar 528.

In various embodiments, ranges defined by filter controls such as those displayed in pop up window 520 are used to indicate criteria for vehicles to be displayed via a charger-facing user interface, such as user interface 502 of FIG. 5A. For example, in the example shown in FIG. 5B, only vehicles last ridden in the last two day, last located in the last two weeks, and for which at least $5 payment is offered would be displayed. In various embodiments, filter and/or search parameter controls such as those shown in FIG. 5B enable a user to focus on a subset of vehicles the user may be most interested in capturing and charging, e.g., to maximize income, minimize wasted trips to retrieve vehicles that may no longer be in their last-reported or last-determined location, etc. In various embodiments, filter controls enable a user to focus on the information of most interest to the user, despite the limited form factor (size) of the display of typical mobile devices and the potentially high density of vehicles that may be located in some high use urban areas.

In the example shown in FIG. 5B, once the user has set the ranges desired by the user, the pop up window 520 is closed by selecting close window control 530.

Figure 5C:
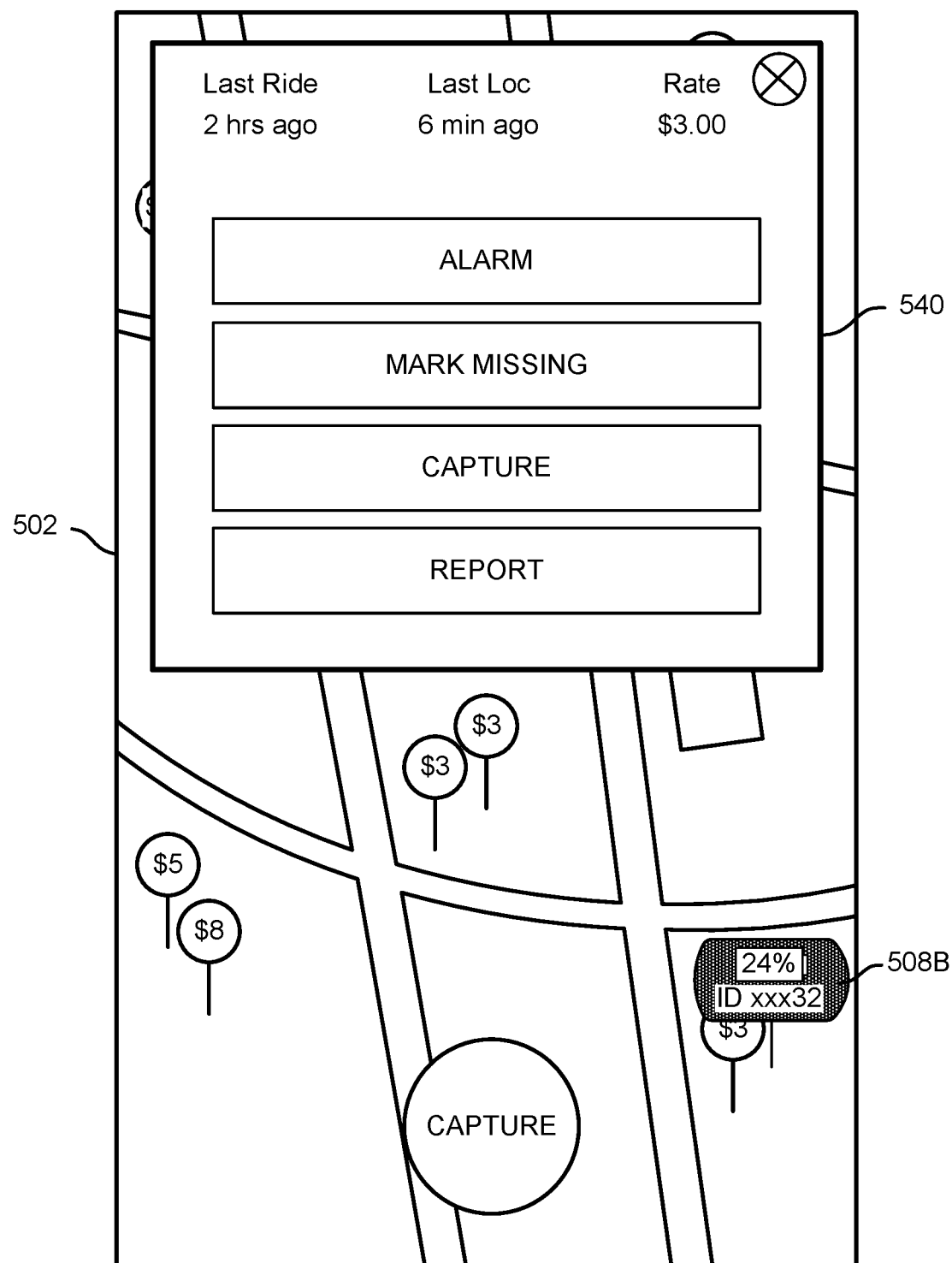
FIG. 5C is a diagram illustrating an embodiment of a user interface to locate electric vehicles to charge them.

FIG. 5C is a diagram illustrating an embodiment of a user interface to locate electric vehicles to charge them. In the example shown, a user has selected the icon 508 of FIG. 5A, resulting in a modified icon 508B and a pop up window 540 being displayed. The modified icon 508B includes additional information about the vehicle, in this example a battery charge level expressed as a percentage of full charge and a vehicle ID number.

The pop up window 540 displays additional information and controls. For example, pop up window 540 displays how long ago this particular vehicle was last ridden, when it was last located, and the payment offered to charge the vehicle. In addition, controls are provided to sound an alarm on the vehicle, which may help to locate the vehicle if it is not visible when the user arrives at the expected location; a button to mark the vehicle as missing if it cannot be located at the expected location; a button to capture the vehicle if it is located and/or to reserve the vehicle for charging by that user for a limited time, e.g., expected travel time to the vehicle plus some buffer; and a button to report a problem with the vehicle, e.g., if it is behind a locked gate or door, damaged, etc.

Once a vehicle has been captured for charging, additional user interface pages may be used by the charging user to manage the user's tasks.

Figure 6:
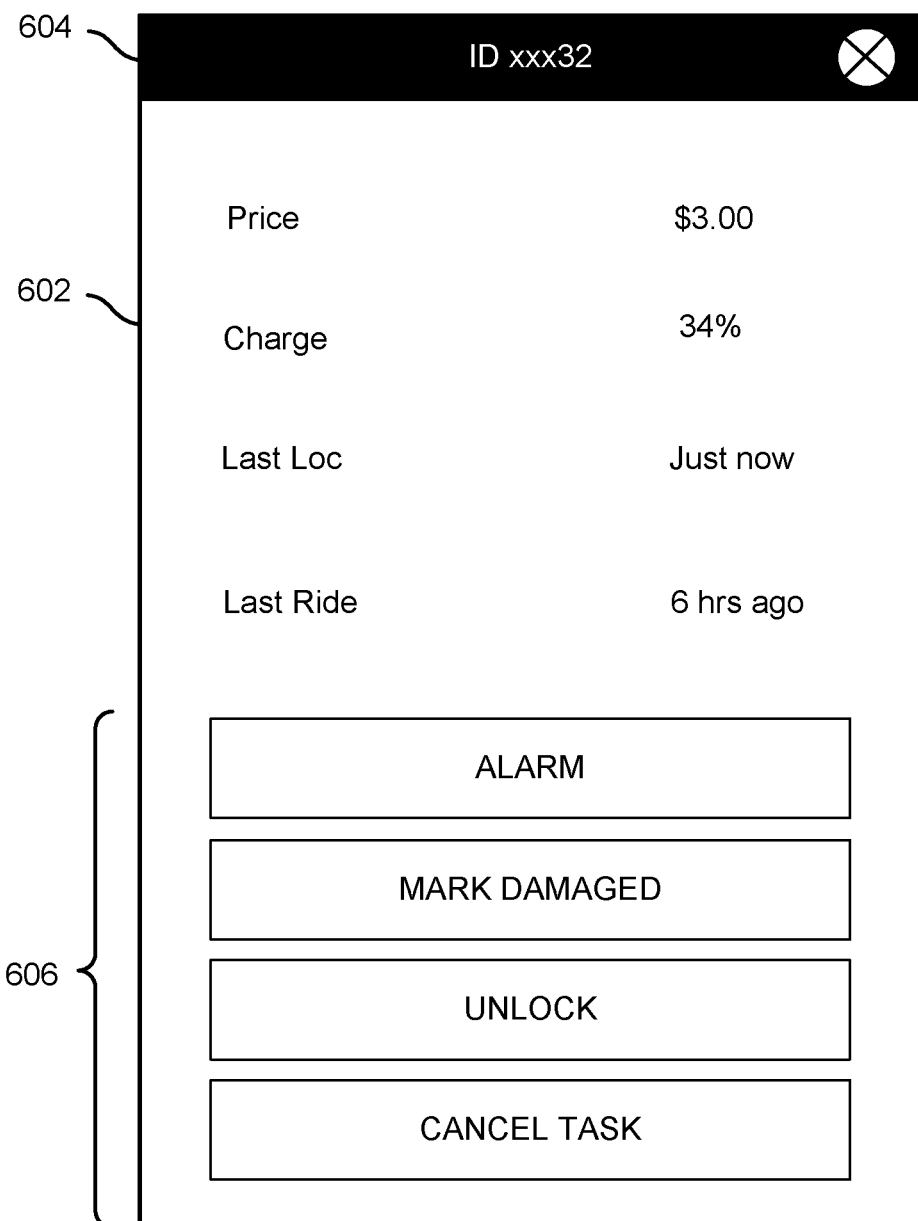
FIG. 6 is a diagram illustrating an embodiment of a user interface to obtain and provide information regarding an electric vehicle to be charged.

FIG. 6 is a diagram illustrating an embodiment of a user interface to obtain and provide information regarding an electric vehicle to be charged. In various embodiments, the user interface 602 of FIG. 6 is accessed by selecting a vehicle in the context of a charger-facing user interface, such as user interface 502 of FIG. 5A through 5C and/or a user interface that lists tasks for a user, such as vehicles captured by that user for charging.

In the example shown, user interface 602 includes a header region 604 in which a vehicle ID and a control button to close the user interface 602 are displayed. In the upper central region of user interface 602, information associated with the vehicle is displayed, e.g., that price offered to charge the vehicle, the battery charge level, how long ago the vehicle location was last reported/determined, and how long ago the vehicle was last ridden. In addition, user interface 602 includes a set of controls 606 operative with respect to the vehicle. In this example, the controls 606 include a button to sound an alarm on the vehicle, e.g., to aid in locating the vehicle and/or distinguishing it among other vehicles at the pickup location or at a location to which the user has brought the vehicle for charging; a button to mark the vehicle as damaged, e.g., if the charging user notes damage to the vehicle at any point during the charging process; a control to unlock the vehicle to be able to move the vehicle more easily for a short distance, e.g., to get it to the charger's vehicle to be transported and/or to get it into a home or business location in which it is to be charged; and a control to cancel a charging task, for example if the vehicle is not located or the user's availability and/or ability to charge the vehicle has changed.

Figure 7:
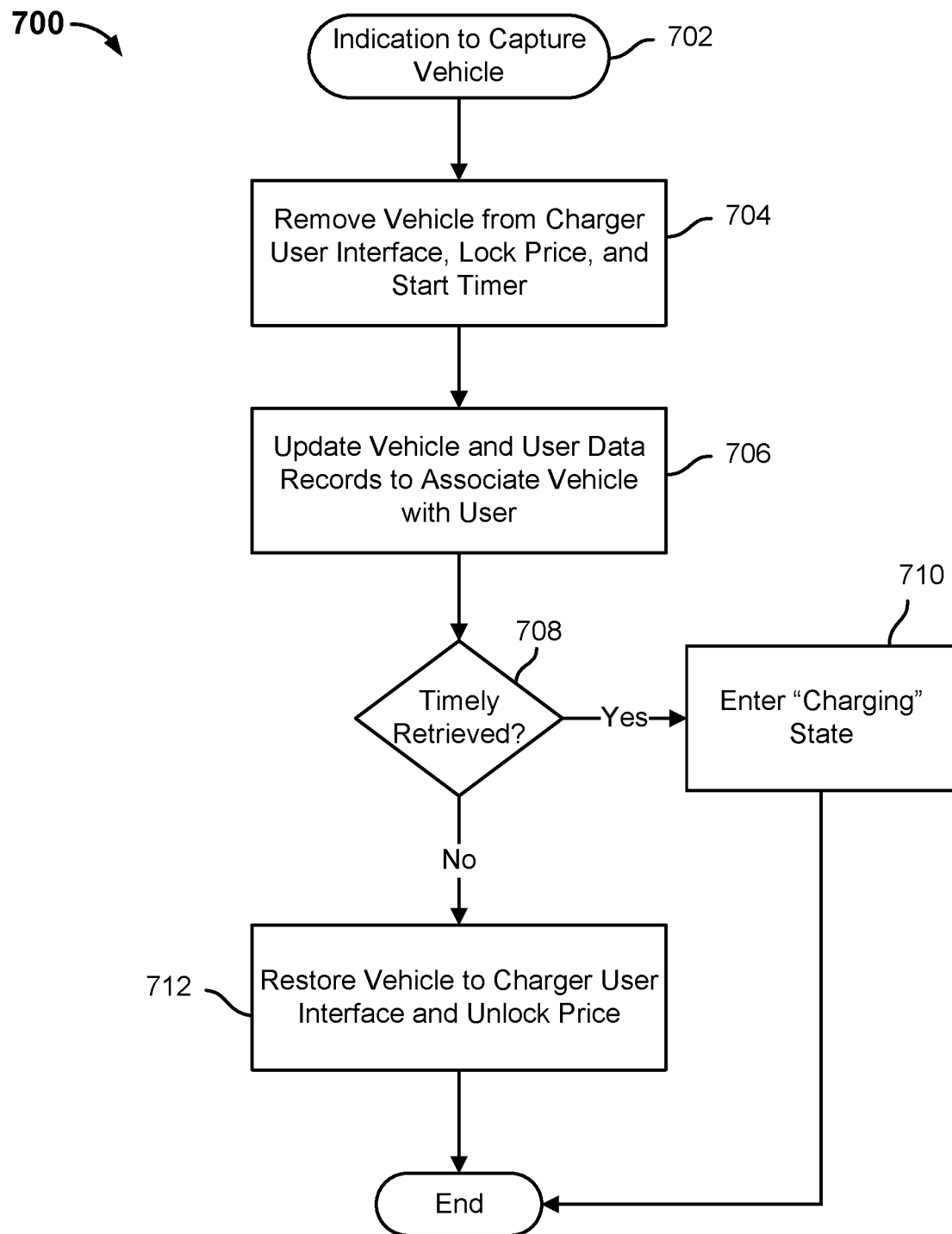
FIG. 7 is a flow chart illustrating an embodiment of a process to "capture" an electric vehicle to charge the vehicle.

FIG. 7 is a flow chart illustrating an embodiment of a process to "capture" an electric vehicle to charge the vehicle.

In various embodiments, the process 700 of FIG. 7 is performed by a backend server, such as backend server 112 of FIG. 1A, based on information received from one or both of vehicles comprising a fleet of on demand electric vehicles and one or more mobile devices associated with one or more users (e.g., chargers).

In the example shown, an indication to capture a vehicle is received (702). For example, a user may have provided an indication via a user interface, such as user interface 502 of FIGS. 5A through 5C and/or user interface 602 of FIG. 6, to capture a specific vehicle, resulting in an indication to capture the vehicle by that user being sent via the Internet to the backend server. The vehicle is removed from the charger-facing user interface as displayed at least to users other than the user who captured the vehicle for charging, and the price offered to charge the vehicle is locked (for a time) and a timer is started (704). The vehicle and user data records are update to reflect that the vehicle has been capture by the user (706). If the user timely retrieves the vehicle (708), for example the user goes to the location of the vehicle and scans the QRC or other code on the vehicle, the vehicle enters the charging state (710) and remains in that state until it has been charged and redeployed by the user. If the user that captured the vehicle does not pick it up within the prescribed time (708), the vehicle is restored to being visible to other users via the charger-facing user interface and being capture by such other users, and the price to charge the vehicle is unlocked (712). In various embodiments, unlocking of the price results in the price offered to charge the vehicle potentially being adjusted dynamically based on conditions, such as the number of chargers who are currently active in a given area, the number of vehicles waiting to be charged, the charge level of the vehicle, how long the vehicle has been waiting to be charged, the current or expected demand for vehicles for rental in the area, time of day, day of the week, difficulty experienced by other users in locating the vehicle, weather conditions, traffic conditions, etc.

Figure 8:
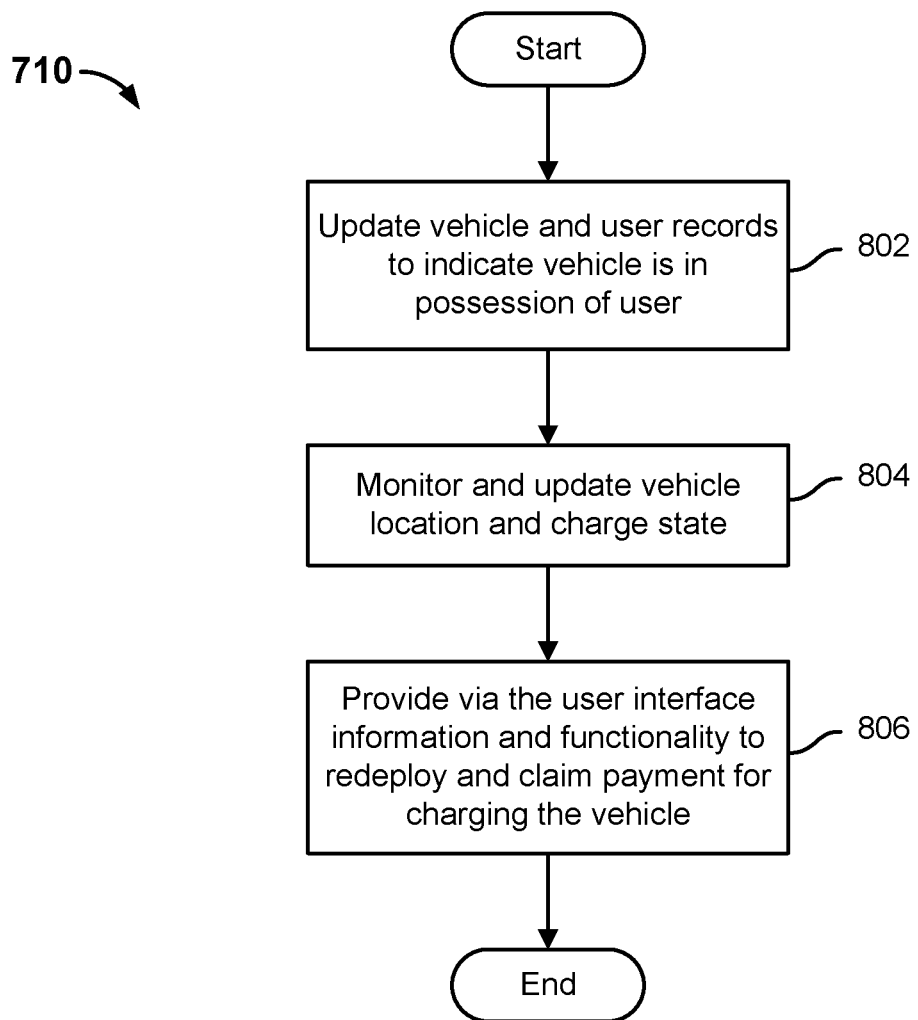
FIG. 8 is a flow chart illustrating an embodiment of a process to place an electric vehicle in a state associated with being out of service to be charged.

FIG. 8 is a flow chart illustrating an embodiment of a process to place an electric vehicle in a state associated with being out of service to be charged. In various embodiments, the process of FIG. 8 is performed to implement step 710 of the process 700 of FIG. 7. In the example shown, upon entering the charging state the vehicle and user records are updated to indicate the vehicle is in the user's possession for charging (802). The vehicle location and charge level are monitored and associated backend data records updates as new information is received (804). In some embodiments, location, charge state, or other information not consistent with and/or expected during charging by the given user may be detected and may trigger responsive action, such as checking in with the user to determine if anything is amiss (e.g., vehicle lost or stolen, vehicle picked up by another user, user not using the authorized charging equipment issued to the user, user subcontracting work or otherwise violating terms of service, etc.). While the vehicle is being charged and/or once the vehicle has been charged, information and functionality to redeploy the vehicle to a desired deployment location and to claim payment for retrieving, charging, and redeploying the vehicle are provided via the charger-facing user interface (806).

In various embodiments, the user interface to redeploy vehicles includes a map-based user interface to locate available locations to redeploy vehicles and to claim/reserve a location or a specified number of vehicle allotments (slots) at the location for a limited time. Once redeployed, a vehicle is scanned or otherwise identified via the user's mobile app, and in some embodiments a photograph is taken using the mobile device and sent to the backed server for processing. Examples of image processing include automated processing (e.g., via machine learning techniques) to determine without human intervention (at least in the first instance) whether the vehicle was parked correctly by the user (e.g., parked upright, using a kickstand, and not blocking doorways, walkways, bike paths, fire hydrants, etc.).

Figure 9A:
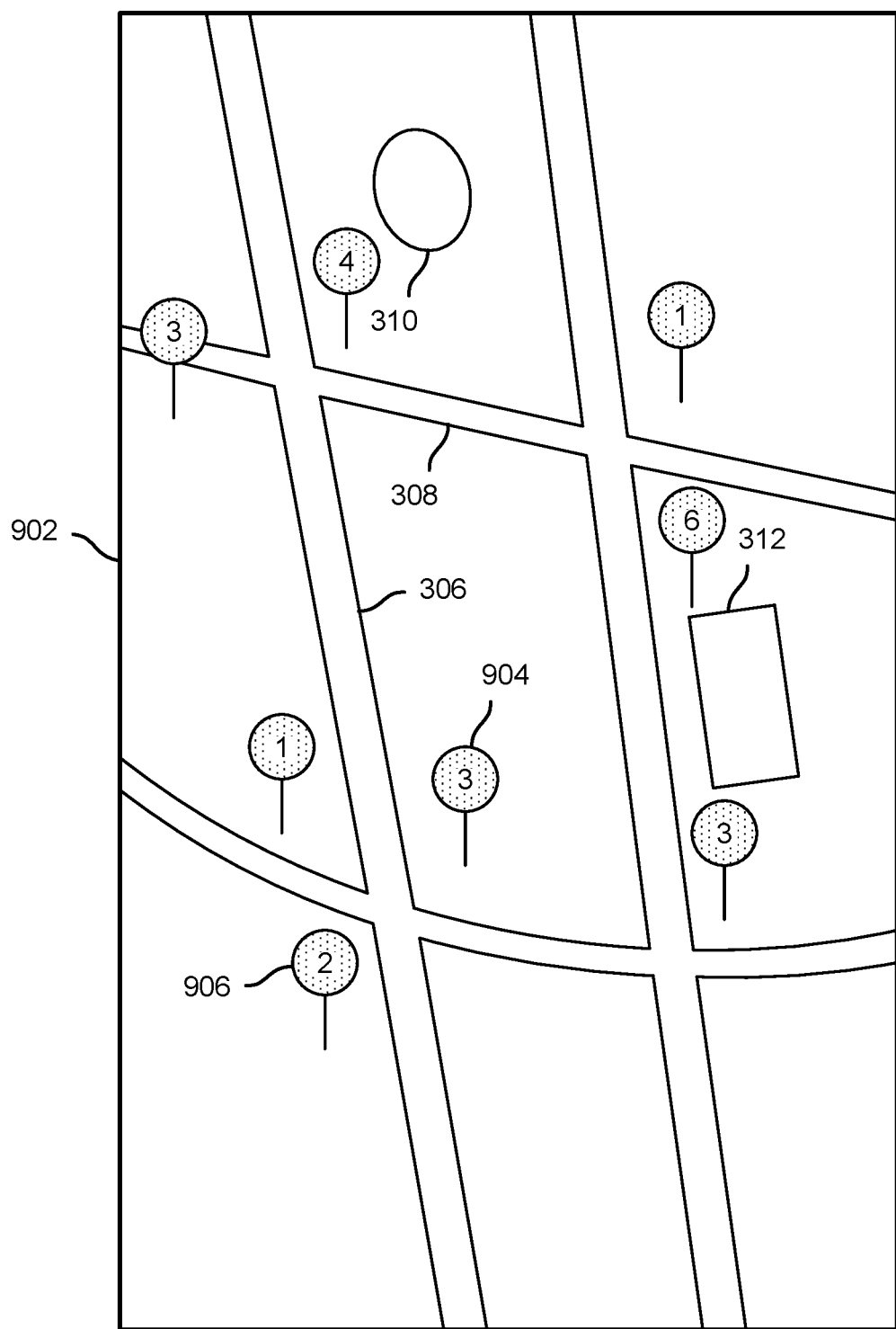
FIG. 9A is a diagram illustrating an embodiment of a user interface to locate, reserve, and use designated locations to redeploy an electric vehicle after charging.

FIG. 9A is a diagram illustrating an embodiment of a user interface to locate, reserve, and use designated locations to redeploy an electric vehicle after charging. In the example shown, user interface 902 displays in a map-based user interface (e.g., streets 306, 308, buildings/landmarks 310, 312) a set of location pin-style icons 906, each marking a location at which one or more vehicles may be redeployed and each indicating a number of spots (remaining) available at that location. In various embodiments, selection of an icon 906 results in a display of further information about the location and/or controls to reserve and/or use the location to redeploy a charged vehicle.

Figure 9B:
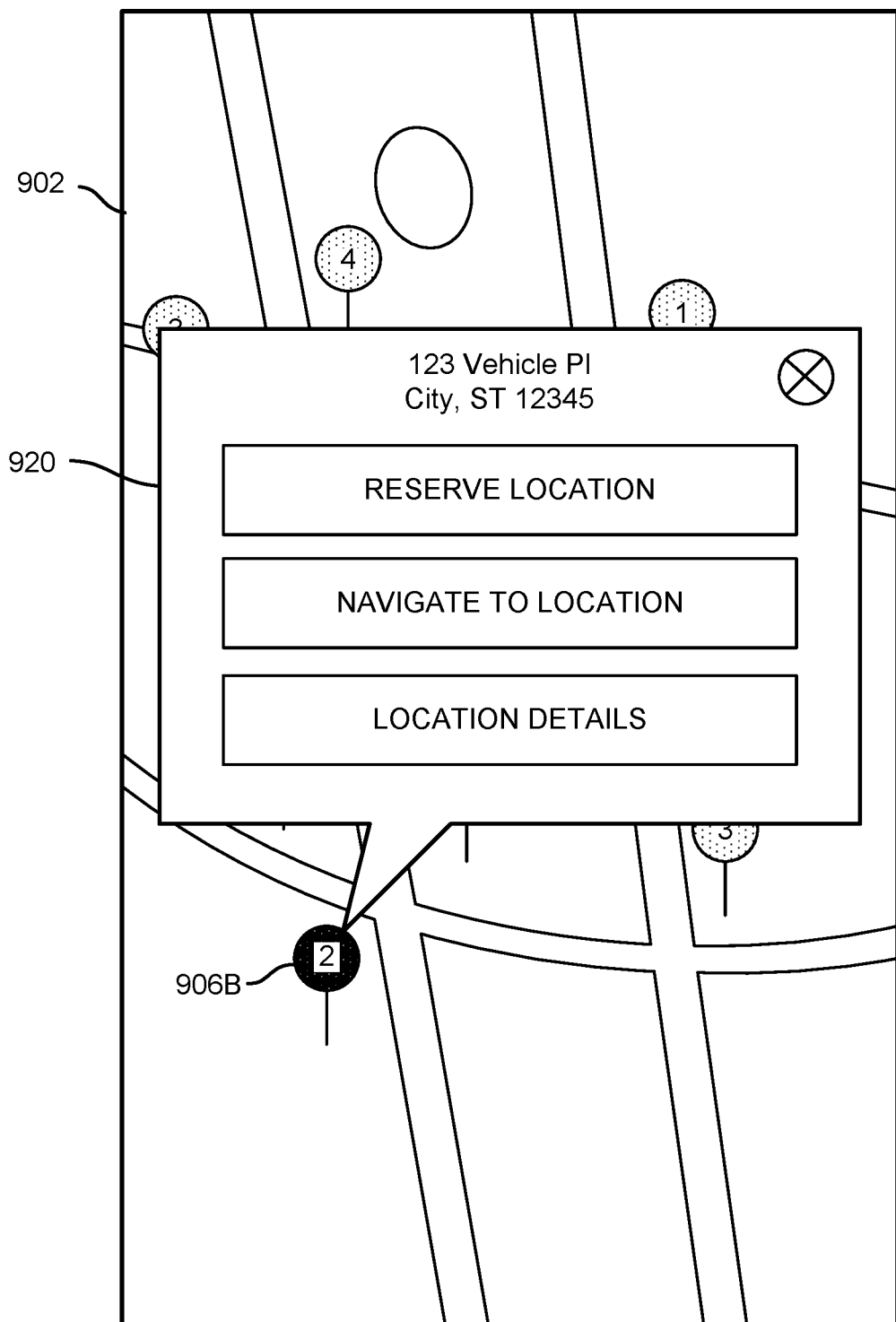
FIG. 9B is a diagram illustrating an embodiment of a user interface to locate, reserve, and use a specific location to redeploy an electric vehicle after charging.

FIG. 9B is a diagram illustrating an embodiment of a user interface to locate, reserve, and use a specific location to redeploy an electric vehicle after charging. In the example shown, a selected icon 906 of FIG. 9A has been selected, resulting in an altered appearance (906B of FIG. 9B) are a callout style pop up window 920 being displayed. Pop up window 920 in this example displays a street address of the location and a set of controls to reserve the location, e.g., to redeploy an indicated number of vehicles and/or specific vehicles, a control to invoke a map functionality (e.g. native map app, Google™ or other third party map or navigation app, etc.) to be assisted in navigating to the location, and a control to access additional details about the location.

Figure 10:
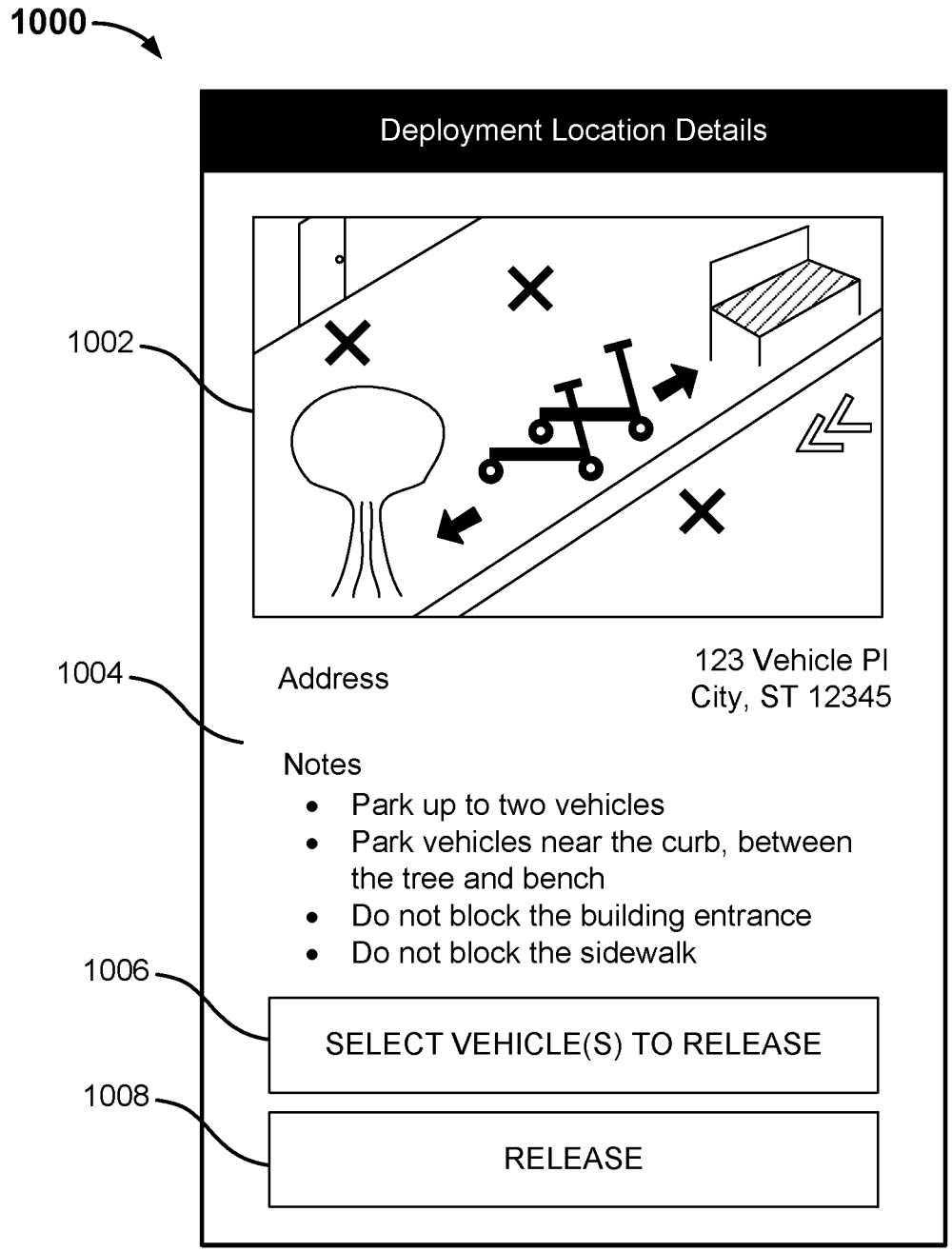
FIG. 10 is a diagram illustrating an embodiment of a user interface to use a specific location to redeploy an electric vehicle after charging.

FIG. 10 is a diagram illustrating an embodiment of a user interface to use a specific location to redeploy an electric vehicle after charging. In some embodiments, the display 1000 of FIG. 10 is displayed upon selection of a control to access additional details about a redeployment location, such as the "location details" control of FIG. 9B.

In the example shown, display 1000 includes a graphical representation 1002 of the correct location and manner of redeploying vehicles at the location. The graphical representation may be a drawing, computer graphic, photograph, and/or a mix of one or more of the above. Areas at which vehicles are permitted/desired to be located and the manner of parking them are represented by vehicle images/drawings. Points of reference, obstacles, and other features are represented and areas in which vehicles should not be placed, such as doorways, walkways, bike paths, roadways, etc., are marked with an "X".

A text display area 1004 displays information about the location, including in this example the street address and notes regarding how vehicles should and should not be left at the location.

A control 1006 enables vehicles to be released at that location to be specified. For example, specific vehicles that have been charged by the user may be selected via a list, table, or other interface to be deployed at the location. A release control 1008 is used to release and return to service the specific vehicles that have been redeployed by the user at the location. For example, the user may be prompted to scan the QRC or other code of each vehicle and to take and submit a photo of the vehicle(s) as parked.

Figure 11:
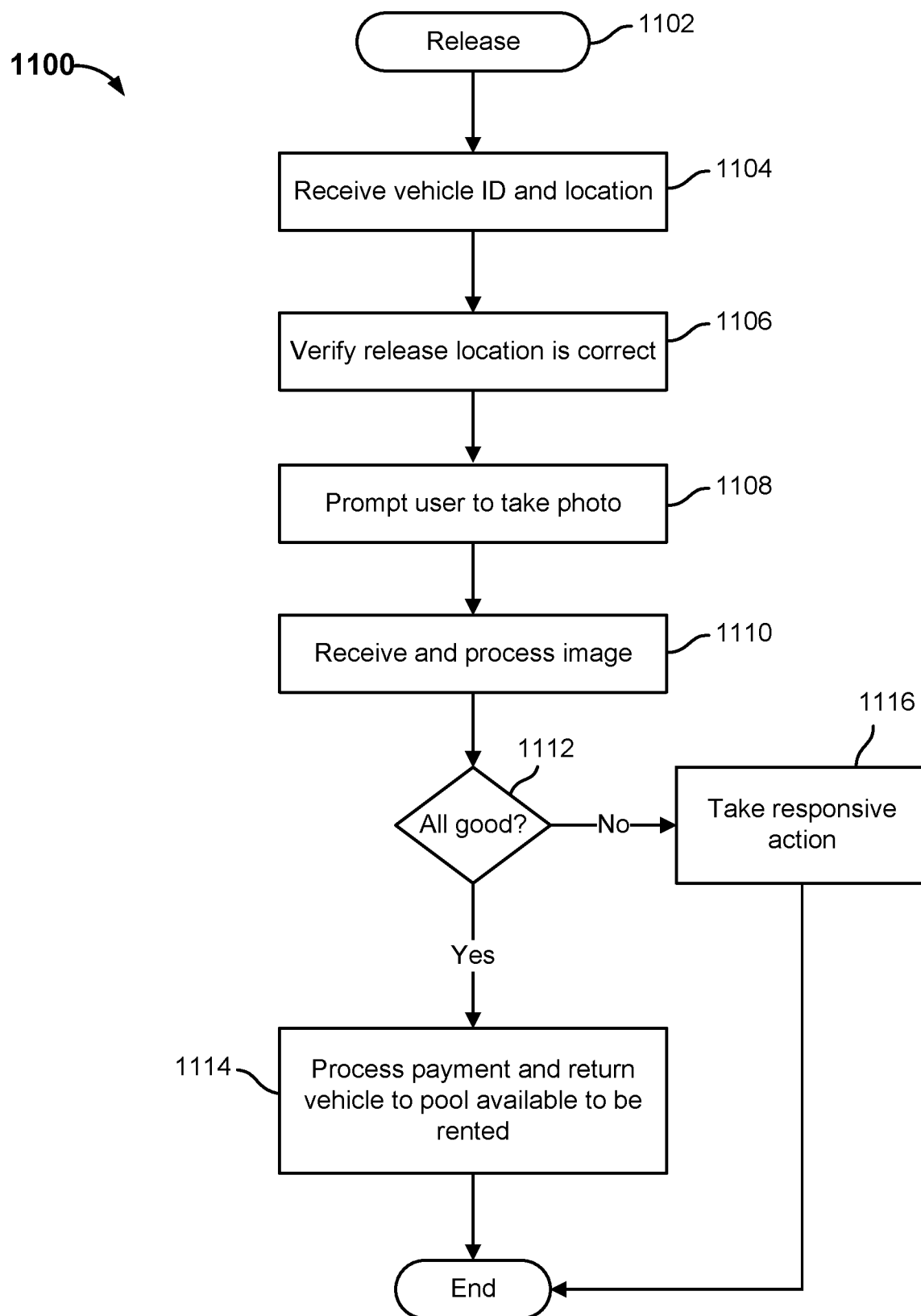
FIG. 11 is a flow chart illustrating an embodiment of a process to return a released electric vehicle back into service.

FIG. 11 is a flow chart illustrating an embodiment of a process to return a released electric vehicle back into service. The process 1100 may be performed by a backend server, such as backend server 112, in some embodiments in cooperation with an instance of a mobile app running on a mobile device, upon receiving an indication that a specific vehicle (or set of vehicles) has been released by a specific user at a specific location. Upon receiving an indication that one or more vehicles have been released (1102), the vehicle identifiers and location data are received (1104). The release location is verified to be correct (1106). In some embodiments, corrective action (not shown in FIG. 11) is taken if the release location is not correct, for example the actual release location does not match the location reserved by the user to redeploy that vehicle. The user is prompted to take and submit a photo of the vehicle(s) as parked (1108). The photo is received and processed (1110). For example, machine learning techniques may be used to determine whether the vehicle(s) is/are parked correctly. A vehicle may be determined based on an image not to be parked correctly if the image is determined to indicate the vehicle is on its side instead of upright, for example, or if the vehicle is determined to be too near a door, in the street, bike path, or sidewalk right of way, etc.

If based on the location and image information the redeployment of the vehicle(s) is determined to be satisfactory (1112), then a transaction to pay the user for retrieving, charging, and redeploying the vehicle is processed and the vehicle is returned to service (e.g., returned to the "available" state and displayed via the rider-facing user interface as being available to rent from the location to which the vehicle has been redeployed) (1114). If the location, charge state, image data, or any other available information indicates the vehicles has not been properly charged and redeployed (1112), then responsive action is taken (1116). For example, the user may be informed via the charger user interface that the manner and/or location in which the vehicle has been parked must be corrected before payment will be made. Or, if the image processing did not determine definitively (e.g., prescribed confidence score) whether the vehicle was parked correctly, the image may be queued for human review before payment is made.

In some embodiments, a charger may be prompted to maintenance actions in connection with charging a vehicle. For example, updates to the vehicle firmware and/or other software may be required to be performed while the vehicle is in the charger's possession. The charger's mobile device and/or WiFi connection or other network access may be taken advantage of to download and install firmware and/or other updates, for example. In some embodiments, the user may be provided via a charger-facing user interface information concerning the need to install updates, the time to install updates, the progress of an update installation, and/or controls to indicate a preferred time of day/night to download and install required updates. Payment to the charger may depend (in whole or in part) on the update being downloaded and installed while the vehicle is in the charger's possession.

A number of examples described above refer to vehicles being charged by chargers; however, in various embodiments, the same systems, processes, and interfaces are adapted to incentive independent contractors to perform other, component, and/or related tasks, such as repair/maintenance and/or vehicle retrieval, delivery, deployment, and/ or relocation services.

In various embodiments, techniques disclosed herein enable a fleet of shared electric vehicles to be deployed, used, charged, repaired, maintained, relocated, otherwise serviced, and redeployed reliably, without requiring the use or availability of a fixed docking station capable of charging the vehicles.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive, via the communication interface from at least a subset of electric vehicles, data representing a corresponding location and a corresponding replenishment-related attribute value of the at least the subset of electric vehicles comprising a fleet of electric vehicles made available for use on demand;
determine based at least in part on the corresponding replenishment-related attribute value of electric vehicles included in the at least the subset of electric vehicles a set of electric vehicles required to be replenished;
provide via the communication interface to each of a plurality of users a display indicating for each electric vehicle included in the set of electrical vehicles required to be replenished a corresponding location of the electric vehicle and a price offered to retrieve, replenish, and redeploy the electric vehicle;
receive from a device associated with one of the plurality of users a selection to retrieve at least one of the electrical vehicles included in the set of electric vehicles required to be replenished; and
update, based on the selection, the display indicating for each electric vehicle included in the set of electrical vehicles required to be replenished, wherein the updated display includes the electric vehicles included in the set of electric vehicles required to be replenished other than the selected at least one of the electric vehicles.

2. The system of claim 1, wherein the corresponding replenishment-related attribute value comprises a battery charge level.

3. The system of claim 1, wherein the data representing the corresponding location and the corresponding replenishment-related attribute value is received from the respective electric vehicles, each being configured to determine and report its own location and battery charge level.

4. The system of claim 1, wherein the data representing the corresponding location and the corresponding replenishment-related attribute value is received from respective mobile devices each brought within communication range of one or more of the at least a subset of electric vehicles.

5. The system of claim 1, wherein the processor is further configured to monitor the corresponding replenishment-related attribute value of electric vehicles that have been retrieved by users for replenishment.

6. The system of claim 1, wherein the processor is further configured to provide to the plurality of users information identifying a plurality of deployment locations available to be used to redeploy electric vehicles that have been replenished by users included in the plurality of users.

7. The system of claim 6, wherein the information identifying a plurality of deployment locations includes for each location a number of spots currently available to be used to redeploy electric vehicles that have been replenished by users.

8. The system of claim 7, wherein the processor is further configured to provide to the plurality of users via an application user interface an ability to reserve for a limited time one or more spots available at a selected location to be used by the reserving user to redeploy a corresponding number of electric vehicles that have been replenished by that user.

9. The system of claim 6, wherein the processor is further configured to provide the information identifying a plurality of deployment locations via a map-based graphical user interface.

10. The system of claim 6, wherein the processor is further configured to receive an indication from a redeploying user that a specific electric vehicle that has been charged by the redeploying user is being redeployed by the redeploying user at a specific one of the plurality of deployment locations.

11. The system of claim 10, wherein the processor is further configured to prompt the redeploying user to take and submit a photograph of the electric vehicle as parked at the specific one of the plurality of deployment locations.

12. The system of claim 11, wherein the processor is further configured to process the photograph using machine learning techniques to determine without human intervention whether the electric vehicle has been parked in a manner that satisfies one or more prescribed criteria.

13. The system of claim 1, wherein said display indicating for each of at least a subset of electrical vehicles required to be charged a location of the vehicle and a price offered to retrieve, charge, and redeploy the vehicle comprises an interactive graphical user interface.

14. The system of claim 13, wherein the interactive graphical user interface includes a set of one or more filter controls, each filter control enables one or both of a lower limit and an upper limit of a range to be defined for a parameter, the processor being further configured to include in the display only a subset of electric vehicles for which the corresponding value for the parameter falls within the defined range.

15. The system of claim 1, wherein the display comprises an interactive graphical user interface that includes a control usable by a capturing user to capture a specific electric vehicle for replenishment by the capturing user.

16. The system of claim 15, wherein capture of a specific electric vehicle by a replenishing user results in the electric vehicle no longer being included in the display as displayed to other users.

17. The system of claim 1, wherein the display includes one or more controls operable to do one or more of the following: sound an alarm or other audible signal from the electric vehicle; report damage to the vehicle; report the vehicle as lost; designate the vehicle as having been captured and picked up; and unlock the vehicle for a limited time and/or range to be able to move it to or from a vehicle for transport to or from a replenishment location.

18. The system of claim 1, wherein the processor is further configured to update dynamically the respective prices offered to charge electric vehicles comprising the at least a subset of electrical vehicles required to be replenished.

19. A method, comprising:
receiving via a communication interface from at least a subset of electric vehicles, data representing a corresponding location and a corresponding replenishment-related attribute value of the at least the subset of electric vehicles comprising a fleet of electric vehicles made available for use on demand; and
using a processor to:
determine based at least in part on the corresponding replenishment-related attribute value of electric vehicles included in the at least the subset of electric vehicles a set of electric vehicles required to be replenished;
provide via the communication interface to each of a plurality of users a display indicating for each electric vehicle included in the set of electrical vehicles required to be replenished a corresponding location of the electric vehicle and a price offered to retrieve, replenish, and redeploy the electric vehicle;
receive from a device associated with one of the plurality of users a selection to retrieve at least one of the electrical vehicles included in the set of electric vehicles required to be replenished; and
update, based on the selection, the display indicating for each electric vehicle included in the set of electrical vehicles required to be replenished, wherein the updated display includes the electric vehicles included in the set of electric vehicles required to be replenished other than the selected at least one of the electric vehicles.

20. A computer program product embodied in a non-transitory computer-readable medium, comprising computer instructions for:
receiving via a communication interface from at least a subset of electric vehicles, data representing a corresponding location and a corresponding replenishment-related attribute value of the at least the subset of electric vehicles comprising a fleet of electric vehicles made available for use on demand;
determining based at least in part on the corresponding replenishment-related attribute value of electric vehicles included in the at least the subset of electric vehicles a set of electric vehicles required to be replenished;
providing via the communication interface to each of a plurality of users a display indicating for each electric vehicle included in the set of electrical vehicles required to be replenished a corresponding location of the electric vehicle and a price offered to retrieve, replenish, and redeploy the electric vehicle;
receiving from a device associated with one of the plurality of users a selection to retrieve at least one of the electrical vehicles included in the set of electric vehicles required to be replenished; and
updating, based on the selection, the display indicating for each electric vehicle included in the set of electrical vehicles required to be replenished, wherein the updated display includes the electric vehicles included in the set of electric vehicles required to be replenished other than the selected at least one of the electric vehicles.

* * * * *

UNITED STATES PATENT AND TRADEMARK OFFICE
CERTIFICATE OF CORRECTION

PATENT NO. : 10,607,492 B2
APPLICATION NO. : 16/376546
DATED : March 31, 2020
INVENTOR(S) : Travis VanderZanden, William Scott Rushforth and Justin Balthrop It is certified that error appears in the above-identified patent and that said Letters Patent is hereby corrected as shown below:

In the Specification

In Column 1, Line(s) 8 & 9, delete "CROWD SOURCED SERVICING OF ON-DEMAND ELECTRIC-VEHICLES" and insert --CROWDSOURCED SERVICING OF ON-DEMAND ELECTRIC-VEHICLES--, therefor.

Signed and Sealed this
Fifteenth Day of September, 2020

Andrei Iancu
*Director of the United States Patent and Trademark Office*